(12) United States Patent
Allbright et al.

(10) Patent No.: US 11,741,474 B2
(45) Date of Patent: *Aug. 29, 2023

(54) SYSTEMS AND METHODS FOR EARLY DETECTION OF NETWORK FRAUD EVENTS

(71) Applicant: MASTERCARD INTERNATIONAL INCORPORATED, Purchase, NY (US)

(72) Inventors: Joshua A. Allbright, Valley Park, MO (US); Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/188,823

(22) Filed: Mar. 1, 2021

(65) Prior Publication Data
US 2021/0182860 A1    Jun. 17, 2021

Related U.S. Application Data

(63) Continuation of application No. 16/235,327, filed on Dec. 28, 2018, now Pat. No. 10,937,030.

(51) Int. Cl.
*G06Q 20/40* (2012.01)
*G06Q 30/018* (2023.01)
*G06N 20/00* (2019.01)

(52) U.S. Cl.
CPC ......... *G06Q 20/4016* (2013.01); *G06N 20/00* (2019.01); *G06Q 30/0185* (2013.01)

(58) Field of Classification Search
CPC . G06Q 20/4016; G06Q 30/0185; G06N 20/00
(Continued)

(56) References Cited

U.S. PATENT DOCUMENTS 6,254,000 B1    7/2001  Degen et al.
6,658,393 B1   12/2003  Basch et al.
(Continued)

FOREIGN PATENT DOCUMENTS

CN       1348566 A    5/2002
CN     105913243 A    8/2016
(Continued)

OTHER PUBLICATIONS

Sudjanto et al., "Statistical Methods for Fighting Financial Crimes", Technometrics 52:.1: 5-19, American Society for Quality, February. (Year: 2010).*

(Continued)

*Primary Examiner* — Frantzy Poinvil
(74) *Attorney, Agent, or Firm* — Armstrong Teasdale LLP

(57) ABSTRACT

A computing system for detecting a pattern of fraudulent network events in a payment card network is configured to continuously receive a plurality of scored transaction authorization requests each including a respective account number and a respective fraud score. The computing system is also configured to sort the scored transaction authorization requests into account ranges based the account number, and sort the transaction authorization requests within each of the account ranges into a fraud score range stripes based on the corresponding fraud score. The computing system is further configured to calculate, for the scored transaction authorization requests within each fraud score range stripe, a ratio of a cumulative metric for a shorter time period over a longer time period, and detect, in near real-time, a fraud event associated with one of the account ranges based on the ratio for one of the fraud score range stripes within the account range.

20 Claims, 8 Drawing Sheets

(58) Field of Classification Search
USPC .................................................. 705/3–44
See application file for complete search history.

(56) References Cited

U.S. PATENT DOCUMENTS

| | | | |
|---|---|---|---|
| 7,580,891 B2 | 8/2009 | Klebanoff | |
| 7,788,195 B1* | 8/2010 | Subramanian | G06N 20/00 706/20 |
| 7,814,008 B2 | 10/2010 | Choudhuri et al. | |
| 8,266,059 B2 | 9/2012 | Horvath et al. | |
| 8,423,467 B1 | 4/2013 | Johansson et al. | |
| 8,489,476 B1 | 7/2013 | Lester et al. | |
| 8,600,872 B1 | 12/2013 | Yan | |
| 8,606,700 B2 | 12/2013 | Carlson et al. | |
| 8,612,340 B1 | 12/2013 | Yan | |
| 8,620,801 B2 | 12/2013 | Choudhuri et al. | |
| 8,694,429 B1 | 4/2014 | Ballaro et al. | |
| 8,706,641 B2 | 4/2014 | Bruesewitz et al. | |
| 8,744,941 B2 | 6/2014 | Chisholm | |
| 8,744,958 B2 | 6/2014 | Carlson et al. | |
| 9,230,280 B1 | 1/2016 | Maag et al. | |
| 9,256,780 B1 | 2/2016 | DeBattista | |
| 9,256,810 B2 | 2/2016 | Wu et al. | |
| 9,256,870 B1 | 2/2016 | Howe | |
| 9,331,994 B2 | 5/2016 | Grigg et al. | |
| 9,392,008 B1 | 7/2016 | Michel et al. | |
| 9,412,108 B2 | 8/2016 | Wang et al. | |
| 9,477,960 B2 | 10/2016 | Grigg et al. | |
| 9,483,766 B2 | 11/2016 | Grigg et al. | |
| 9,547,864 B2 | 1/2017 | Howe | |
| 9,601,000 B1 | 3/2017 | Gruss et al. | |
| 9,619,801 B2 | 4/2017 | Sikljovan | |
| 9,661,012 B2 | 5/2017 | Michel et al. | |
| 9,721,080 B2 | 8/2017 | Moran et al. | |
| 9,898,741 B2 | 2/2018 | Siegel et al. | |
| 10,308,033 B2 | 6/2019 | Sato et al. | |
| 10,339,606 B2 | 7/2019 | Gupta et al. | |
| 10,380,333 B1 | 8/2019 | Moran et al. | |
| 10,395,243 B1 | 8/2019 | Johansson et al. | |
| 10,586,235 B2 | 3/2020 | Wang et al. | |
| 10,937,030 B2 | 3/2021 | Allbright et al. | |
| 11,151,569 B2 | 10/2021 | Allbright et al. | |
| 11,157,913 B2 | 10/2021 | Allbright et al. | |
| 11,366,884 B2* | 6/2022 | Liu | G06Q 20/4016 |
| 2002/0099649 A1* | 7/2002 | Lee | G06Q 40/06 705/38 |
| 2003/0217094 A1 | 11/2003 | Andrews et al. | |
| 2004/0034604 A1 | 2/2004 | Klebanoff | |
| 2004/0162773 A1 | 8/2004 | Del Rey et al. | |
| 2005/0055373 A1 | 3/2005 | Forman | |
| 2007/0094067 A1 | 4/2007 | Kumar et al. | |
| 2007/0185782 A1 | 8/2007 | Shooks et al. | |
| 2007/0203732 A1 | 8/2007 | Griegel et al. | |
| 2009/0132347 A1 | 5/2009 | Anderson et al. | |
| 2009/0132404 A1 | 5/2009 | King et al. | |
| 2009/0276269 A1 | 11/2009 | Yee et al. | |
| 2009/0307049 A1 | 12/2009 | Elliott et al. | |
| 2010/0228580 A1 | 9/2010 | Zoldi et al. | |
| 2010/0280882 A1 | 11/2010 | Faith et al. | |
| 2011/0055074 A1 | 3/2011 | Chen et al. | |
| 2011/0078034 A1 | 3/2011 | Hayhow | |
| 2012/0084207 A1 | 4/2012 | Horvath et al. | |
| 2012/0239557 A1 | 9/2012 | Weinflash et al. | |
| 2012/0296824 A1 | 11/2012 | Rosano | |
| 2013/0036036 A1 | 2/2013 | Zoldi | |
| 2013/0159077 A1 | 6/2013 | Stringfellow et al. | |
| 2013/0231976 A1 | 9/2013 | Tavares et al. | |
| 2013/0297473 A1 | 11/2013 | Wolfe | |
| 2014/0032409 A1 | 1/2014 | Rosano | |
| 2014/0249934 A1 | 9/2014 | Subramanian et al. | |
| 2014/0258099 A1 | 9/2014 | Rosano | |
| 2014/0279185 A1 | 9/2014 | Merz et al. | |
| 2014/0279331 A1 | 9/2014 | Gimby et al. | |
| 2014/0324522 A1 | 10/2014 | Wilkins et al. | |
| 2014/0337215 A1 | 11/2014 | Howe | |
| 2015/0012430 A1 | 1/2015 | Chisholm et al. | |
| 2015/0046338 A1 | 2/2015 | Laxminarayanan et al. | |
| 2015/0073981 A1 | 3/2015 | Adjaoute | |
| 2015/0127547 A1 | 5/2015 | Powell et al. | |
| 2015/0220999 A1 | 8/2015 | Thornton et al. | |
| 2015/0339667 A1 | 11/2015 | Dua | |
| 2015/0339673 A1 | 11/2015 | Adjaoute | |
| 2015/0348023 A1 | 12/2015 | Fisher et al. | |
| 2015/0371207 A1 | 12/2015 | Cummins et al. | |
| 2016/0125317 A1 | 5/2016 | Benjamin | |
| 2016/0125405 A1 | 5/2016 | Alterman et al. | |
| 2016/0140561 A1* | 5/2016 | Cowan | G06Q 20/4016 705/26.35 |
| 2016/0155124 A1 | 6/2016 | Howe | |
| 2016/0162759 A1 | 6/2016 | Yun et al. | |
| 2016/0171498 A1 | 6/2016 | Wang et al. | |
| 2016/0180333 A1 | 6/2016 | Leyva | |
| 2016/0196615 A1 | 7/2016 | Yen et al. | |
| 2016/0217470 A1 | 7/2016 | Gerard et al. | |
| 2016/0321634 A1* | 11/2016 | George | G06Q 20/202 |
| 2016/0335641 A1 | 11/2016 | White et al. | |
| 2016/0352766 A1 | 12/2016 | Flacher et al. | |
| 2016/0364727 A1 | 12/2016 | Delawter et al. | |
| 2016/0364728 A1 | 12/2016 | Delawter et al. | |
| 2017/0053294 A1 | 2/2017 | Yang et al. | |
| 2017/0116585 A1 | 4/2017 | Rosano | |
| 2017/0140262 A1 | 5/2017 | Wilson et al. | |
| 2017/0169500 A1 | 6/2017 | Merz et al. | |
| 2017/0193515 A1 | 7/2017 | Sharan et al. | |
| 2017/0293906 A1 | 10/2017 | Komarov | |
| 2017/0352026 A1 | 12/2017 | Musil et al. | |
| 2018/0018670 A1 | 1/2018 | Ju et al. | |
| 2018/0047024 A1 | 2/2018 | Niehaus | |
| 2018/0053188 A1 | 2/2018 | Zoldi et al. | |
| 2018/0114203 A1 | 4/2018 | Senci et al. | |
| 2018/0182029 A1 | 6/2018 | Vinay | |
| 2018/0218369 A1 | 8/2018 | Xiao et al. | |
| 2019/0066109 A1 | 2/2019 | Jia et al. | |
| 2019/0073647 A1 | 3/2019 | Zoldi et al. | |
| 2019/0130403 A1 | 5/2019 | Merz et al. | |
| 2019/0220864 A1 | 7/2019 | Avegliano et al. | |
| 2019/0220865 A1 | 7/2019 | Weber | |
| 2019/0279309 A1 | 9/2019 | Gupta et al. | |
| 2019/0385170 A1* | 12/2019 | Arrabothu | G06N 7/005 |
| 2020/0211022 A1 | 7/2020 | Allbright et al. | |
| 2020/0311285 A1* | 10/2020 | Jochems | H04W 4/021 |
| 2021/0304207 A1* | 9/2021 | Lo Faro | G06Q 40/02 |
| 2021/0357940 A1* | 11/2021 | Benkreira | H04W 12/08 |

FOREIGN PATENT DOCUMENTS

| | | |
|---|---|---|
| EP | 2420966 A1 | 2/2012 |
| WO | 2001077959 A1 | 10/2001 |
| WO | 2002025495 A1 | 3/2002 |
| WO | 2004070293 A1 | 8/2004 |
| WO | 2009067346 A2 | 5/2009 |
| WO | 2011025689 A1 | 3/2011 |
| WO | 2011077959 A1 | 6/2011 |
| WO | 2012135115 A2 | 10/2012 |
| WO | 2017031039 A1 | 2/2017 |

OTHER PUBLICATIONS

Sanchez-Aguayo et al., "Fraud Detection Using the Fraud Triangle Theory and Data Mining Techniques: A literature review", Computers 10.10:121. MDPI AG.. (Year: 2021).*

"Technology Briefs", Publication Info: Card News; Potomac vol. 14, Iss. 4, March (Year: 1999).

Baboo et al. "Analysis of Spending Pattern on Credit Card Fraud Detection," IOSR Journal of Computer Engineering, Mar-Apr. 2017 (Year: 2017).

PCT International Search Report and Written Opinion, Application No. PCT/US2018/031980, dated Jul. 26, 2018, 11 pps.

PCT International Search Report and Written Opinion, Application No. PCT/US2018/052143, dated Dec. 7, 2018, 12 pps.

PCT International Search Report and Written Opinion, Application No. PCT/US2018/052145, dated Feb. 12, 2019, 12 pps.

(56) References Cited

OTHER PUBLICATIONS

PCT International Search Report and Written Opinion, Application No. PCT/US2018/059326, dated Mar. 7, 2019, 11 pps.

Baboo et al., "Analysis of Spending Pattern on Credit Card Detection," IOSR Journal of Computer Engineering, Mar.-Apr. 2017 (Year: 2017).

T. K. Behera and S. Panigrahi, "Credit Card Fraud Detection: A Hybrid Approach Using Fuzzy Clustering Neural Network," 2015 Second International Conference on Advances in Computing and Communication Engineering, Dehradun, 2015, pp. 494-499, doi: 10.1109/ICACCE.2015.33. (Year: 2015).

Wikipedia, "Collaborative Filtering," https://web.archive.org (Year: 2017).

\* cited by examiner

SYSTEMS AND METHODS FOR EARLY DETECTION OF NETWORK FRAUD EVENTS

CROSS-REFERENCE TO RELATED APPLICATIONS

This application is a continuation application of U.S. patent application Ser. No. 16/235,327, filed Dec. 28, 2018, the entire contents of which are hereby incorporated by reference herein.

BACKGROUND

This disclosure relates generally to fraud detection in a network and, more particularly, to computer systems and computer-based methods for early detection of a fraud attack on the network.

Payment processing networks process numerous payment card transactions every day that are initiated by cardholders of payment cards. Most of these payment card transactions are valid transactions. However, at least some of these payment card transactions are fraudulent. Payment card transaction processors, such as payment networks and issuing banks, may monitor payment card transactions for signs of fraudulent activity. At least some known fraud detection systems monitor payment card transactions one payment card transaction at a time to determine whether the payment card transaction is potentially fraudulent. Such systems may not be able to detect certain types of widespread fraud attacks, such as when a set of payment card account data associated with a particular issuer and/or a particular geographic region is compromised.

BRIEF DESCRIPTION

In one embodiment, a computing system for detecting a pattern of fraudulent network events in a payment card network is provided. The computing system includes at least one processor programmed to continuously receive a plurality of scored transaction authorization requests each including a respective account number and a respective fraud score, wherein the respective fraud score is proportional to indicia of fraud present in an individual transaction corresponding to the respective scored transaction authorization request. The at least one processor is also programmed to sort the scored transaction authorization requests into a plurality of account ranges, wherein each of the account ranges includes the scored transaction authorization requests having the account number within the corresponding account range, and sort the transaction authorization requests within each of the account ranges into a plurality of fraud score range stripes based on the corresponding fraud score. The at least one processor is further programmed to calculate, for the scored transaction authorization requests within each fraud score range stripe within each account range, a ratio of a cumulative metric for a shorter time period over a longer time period, wherein the shorter and longer time periods extend back from a common starting point, and detect, in near real-time relative to the common starting point, a fraud event associated with one of the account ranges based on the ratio for one of the fraud score range stripes within the one of the account ranges. The one of the fraud score range stripes corresponds to a subset of the scored transaction authorization requests associated with relatively few of the indicia of fraud in the corresponding individual transactions.

In another embodiment, a computer-implemented method for detecting a pattern of fraudulent network events in a payment card network is provided. The method is implemented by a computing system including at least one processor. The method includes, by the at least one processor, continuously receiving a plurality of scored transaction authorization requests each including a respective account number and a respective fraud score, wherein the respective fraud score is proportional to indicia of fraud present in an individual transaction corresponding to the respective scored transaction authorization request. The method also includes, by the at least one processor, sorting the scored transaction authorization requests into a plurality of account ranges, wherein each of the account ranges includes the scored transaction authorization requests having the account number within the corresponding account range, and sorting the transaction authorization requests within each of the account ranges into a plurality of fraud score range stripes based on the corresponding fraud score. The method further includes, by the at least one processor, calculating, for the scored transaction authorization requests within each fraud score range stripe within each account range, a ratio of a cumulative metric for a shorter time period over a longer time period, wherein the shorter and longer time periods extend back from a common starting point, and detecting, in near real-time relative to the common starting point, a fraud event associated with one of the account ranges based on the ratio for one of the fraud score range stripes within the one of the account ranges. The one of the fraud score range stripes corresponds to a subset of the scored transaction authorization requests associated with relatively few of the indicia of fraud in the corresponding individual transactions.

In a further embodiment, at least one non-transitory computer-readable storage media having computer-executable instructions embodied thereon is provided. When executed by at least one processor, the computer-executable instructions cause the at least one processor to continuously receive a plurality of scored transaction authorization requests each including a respective account number and a respective fraud score, wherein the respective fraud score is proportional to indicia of fraud present in an individual transaction corresponding to the respective scored transaction authorization request. The computer-executable instructions also cause the at least one processor to sort the scored transaction authorization requests into a plurality of account ranges, wherein each of the account ranges includes the scored transaction authorization requests having the account number within the corresponding account range, and sort the transaction authorization requests within each of the account ranges into a plurality of fraud score range stripes based on the corresponding fraud score. The computer-executable instructions further cause the at least one processor to calculate, for the scored transaction authorization requests within each fraud score range stripe within each account range, a ratio of a cumulative metric for a shorter time period over a longer time period, wherein the shorter and longer time periods extend back from a common starting point, and detect, in near real-time relative to the common starting point, a fraud event associated with one of the account ranges based on the ratio for one of the fraud score range stripes within the one of the account ranges. The one of the fraud score range stripes corresponds to a subset of the scored transaction authorization requests associated with relatively few of the indicia of fraud in the corresponding individual transactions In one embodiment, a computing system for detecting fraudulent network events in a payment card network is provided. The computing system includes a ratio striping engine configured to receive a plurality of scored payment card transaction authorization requests. Each of the scored payment card transaction authorization requests includes a respective one of a plurality of payment card transaction authorization requests received via a payment card interchange network. Each of the payment card transaction authorization requests includes a respective account number and is associated with a respective fraud score. The ratio striping engine is also configured to generate, for each of a plurality of account ranges, a respective account range data structure. Each account range data structure includes the scored payment card transaction authorization requests having the account number within the corresponding account range, and each account range data structure sorts the payment card transaction authorization requests within the associated account range over a plurality of fraud score range stripes based on the corresponding fraud score. The ratio striping engine is further configured to parse each of the account range data structures over a plurality of ratio striping time periods. Each of the ratio striping time periods extends back over a respective predetermined ratio striping interval from a common ratio striping starting point. Additionally, the ratio striping engine is also configured to calculate, for each account range data structure for each of the ratio striping time periods, at least one cumulative account range metric from the payment card transaction authorization requests associated with each of the fraud score range stripes, and determine, for each account range data structure, a plurality of ratio striping values. Each of the ratio striping values is a ratio of a first value of the at least one cumulative account range metric in a first of the fraud score range stripes from a first ratio striping time period with respect to a second value of the at least one cumulative account range metric in the first fraud score range stripe from a second ratio striping time period. The ratio striping engine is also configured to detect a fraud event associated with at least one of the account ranges based on the ratio striping values determined for the corresponding account range data structure.

In another embodiment, a computer-implemented method for detecting fraudulent network transactions in a payment card transaction network is provided. The method includes receiving, by the at least one processor, a plurality of scored payment card transaction authorization requests. Each of the scored payment card transaction authorization requests includes a respective one of a plurality of payment card transaction authorization requests received via a payment card interchange network. Each of the payment card transaction authorization requests includes a respective account number and is associated with a respective fraud score. The method also includes generating, by the at least one processor for each of a plurality of account ranges, a respective account range data structure. Each account range data structure includes the scored payment card transaction authorization requests having the account number within the corresponding account range, and each account range data structure sorts the payment card transaction authorization requests within the associated account range over a plurality of fraud score range stripes based on the corresponding fraud score. The method further includes parsing, by the at least one processor, each of the account range data structures over a plurality of ratio striping time periods. Each of the ratio striping time periods extends back over a respective predetermined ratio striping interval from a common ratio striping starting point. Additionally, the method includes calculating, by the at least one processor for each account range data structure for each of the ratio striping time periods, at least one cumulative account range metric from the payment card transaction authorization requests associated with each of the fraud score range stripes, and determining, by the at least one processor for each account range data structure, a plurality of ratio striping values. Each of the ratio striping values is a ratio of a first value of the at least one cumulative account range metric in a first of the fraud score range stripes from a first ratio striping time period with respect to a second value of the at least one cumulative account range metric in the first fraud score range stripe from a second ratio striping time period. The method also includes detecting, by the at least one processor, a fraud event associated with at least one of the account ranges based on the ratio striping values determined for the corresponding account range data structure.

In yet another embodiment, one or more non-transitory computer-readable storage media having computer-executable instructions embodied thereon is provided. When executed by at least one processor, the computer-executable instructions cause the at least one processor to receive a plurality of scored payment card transaction authorization requests. Each of the scored payment card transaction authorization requests includes a respective one of a plurality of payment card transaction authorization requests received via a payment card interchange network. Each of the payment card transaction authorization requests includes a respective account number and is associated with a respective fraud score. The computer-executable instructions also cause the at least one processor to generate, for each of a plurality of account ranges, a respective account range data structure. Each account range data structure includes the scored payment card transaction authorization requests having the account number within the corresponding account range, and each account range data structure sorts the payment card transaction authorization requests within the associated account range over a plurality of fraud score range stripes based on the corresponding fraud score. The computer-executable instructions further cause the at least one processor to parse each of the account range data structures over a plurality of ratio striping time periods. Each of the ratio striping time periods extends back over a respective predetermined ratio striping interval from a common ratio striping starting point. Additionally, the computer-executable instructions cause the at least one processor to calculate, for each account range data structure for each of the ratio striping time periods, at least one cumulative account range metric from the payment card transaction authorization requests associated with each of the fraud score range stripes, and determine, for each account range data structure, a plurality of ratio striping values. Each of the ratio striping values is a ratio of a first value of the at least one cumulative account range metric in a first of the fraud score range stripes from a first ratio striping time period with respect to a second value of the at least one cumulative account range metric in the first fraud score range stripe from a second ratio striping time period. The computer-executable instructions also cause the at least one processor to detect a fraud event associated with at least one of the account ranges based on the ratio striping values determined for the corresponding account range data structure.

BRIEF DESCRIPTION OF THE DRAWINGS

FIG. 1 is a simplified block diagram of an example fraud analysis computing system for detecting fraudulent network events in a payment card interchange network in accordance with one example embodiment of the present disclosure.

FIG. 2 illustrates a graphical user interface generated by the computing system shown in FIG. 1.

FIG. 3 is a schematic diagram illustrating an example multi-party payment card industry system for enabling ordinary payment-by-card transactions in which merchants and card issuers do not necessarily have a one-to-one relationship.

FIG. 4 is a simplified block diagram of the fraud analysis computing system shown in FIG. 1 in communication with the payment interchange network shown in FIG. 3 in accordance with one embodiment of the present disclosure.

FIG. 5 illustrates an example configuration of a client system shown in FIG. 4.

FIG. 6 illustrates an example configuration of a server system shown in FIG. 4.

FIG. 7 shows an example configuration of the fraud analysis computing system shown in FIG. 1.

FIG. 8 is a flow diagram of a computer-implemented method for detecting fraudulent network transactions in a payment card transaction network.

DETAILED DESCRIPTION

Figure 1:
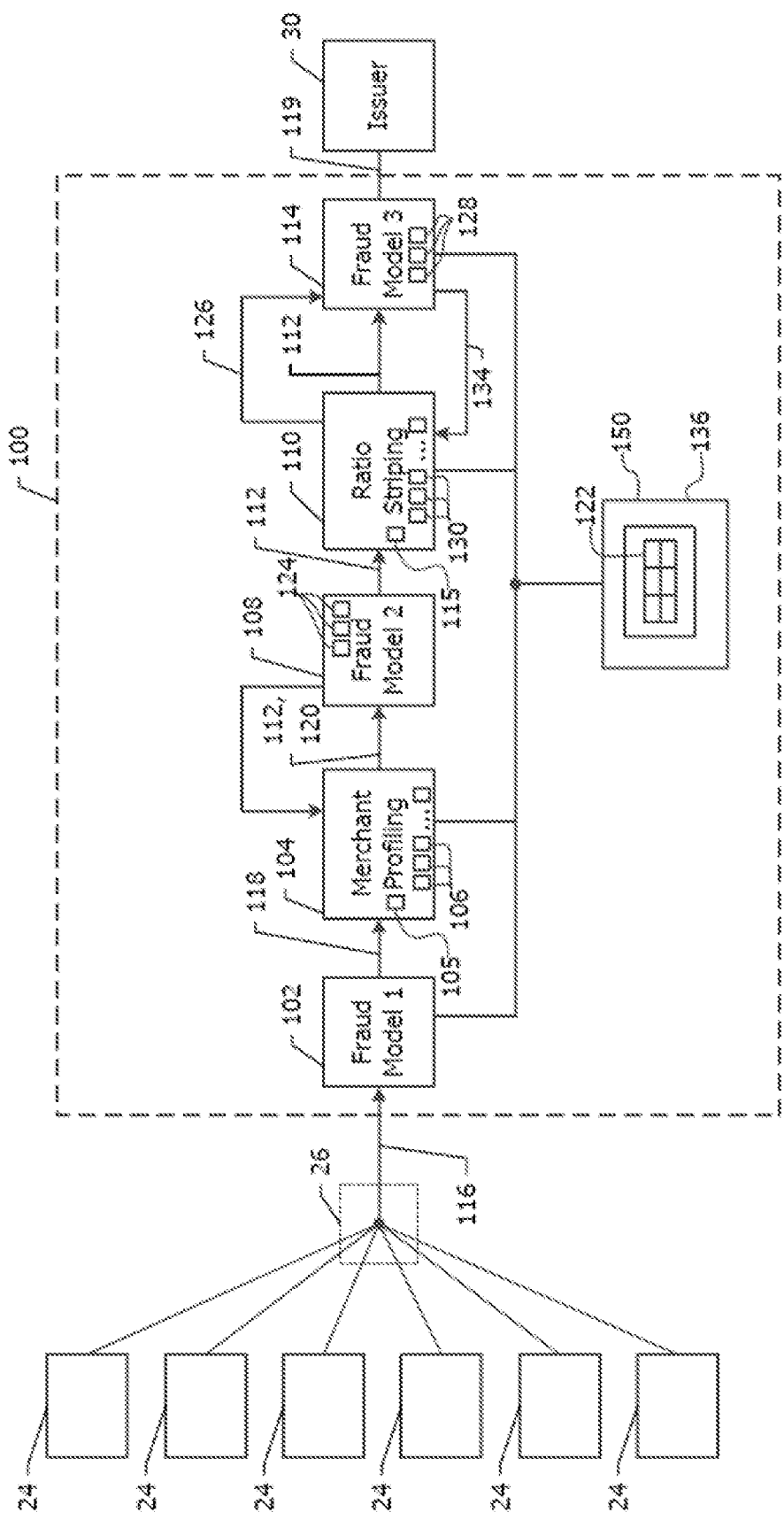
FIGS. 1-8 show example embodiments of the methods and systems described herein.

Embodiments of the present disclosure describe a fraud analysis computing system, and method implemented using a computing system, that is in communication with a data warehouse associated with a payment card network. The methods and systems described herein utilize multiple fraud detection models in series in real time. Initially, payment card transaction authorization requests are scored on a per transaction basis for a likelihood of the underlying payment card transaction being a fraudulent transaction. After the payment card transaction authorization requests have been individually scored, in some embodiments, a merchant profiling engine processes the requests and produces additional data about groups of transaction authorization requests associated with a particular merchant group. The additional data is used to reweight the individual fraud score associated with the payment card transaction authorization requests. A ratio striping engine processes the scored requests and produces additional data about groups of transaction authorization requests associated with a particular range of primary account numbers. For example, the range of account numbers is associated with a particular issuer, and the additional data provides a real-time indication that payment card account data associated with the particular issuer has been compromised.

The fraud analysis computing system receives the scored payment card transaction authorization requests or a representation of the scored payment card transaction authorization requests that does not have the full complement of data contained in payment card transaction authorization requests. For example, for personally identifiable information concerns, only a subset of the data in each payment card authorization request may be transmitted to the fraud analysis computing system. This might be important if the fraud analysis computing system processing was performed by a third party service provider. In one embodiment, only the preliminary fraud score, account number merchant data, and timestamp data is necessary for the fraud analysis computing system to give meaningful output data.

In an embodiment, the fraud analysis computing system includes a merchant profiling engine that generates a merchant profile using data regarding payment card transaction authorization requests for a merchant, merchant bank, merchant category, or other grouping of merchants. The merchant, merchant bank, merchant category, or other grouping of merchants selected for analysis may be referred to as a merchant group (it should be understood that a particular "merchant group" may encompass only a single merchant). The merchant profile is associated with current activity at a particular merchant group. The incoming scored payment card transaction authorization requests and metrics associated with the payment card transaction authorization requests are tracked into different time periods. Within each time period, for example, the computing device tallies the number of payment card transaction authorization requests within the time period and determines the total value of the amounts (e.g., monetary amounts) of the payment card transaction authorization requests within the time period. In some embodiments, the time periods for the cumulative merchant profiling metrics are defined and/or tracked by storing and parsing merchant profiling data structures in a computer memory for each merchant, merchant bank, merchant category, or other grouping of merchants The merchant profiling time period duration is predetermined or selectable. The merchant profiling time periods each extend back over a respective predetermined interval from a common starting point, and thus overlap one another. In one example, during routine surveillance of the incoming individually scored payment card transaction authorization requests, the merchant profiling time periods may be set at certain fixed intervals. For example, the time periods could include six fixed intervals, which are fixed to look at time durations immediately previous to a particular time (e.g., the present time or a time associated with a payment card transaction authorization request), with lengths of 15 minutes, 1 hour, 6 hours, 24 hours, 7 days, and 28 days. During a suspected fraud attack, the duration of the merchant profiling time periods may be modified "on-the-fly" to provide data that the merchant profiling engine needs to fully ascertain parameters of the fraud attack.

All the instances of the payment card transaction authorization requests that are in each merchant profiling time period can be tallied together, yielding a single value representing how many payment card transaction authorization requests arrived within a certain time period for the merchant, merchant bank, merchant category, or other grouping of merchants associated with the data represented on the graph. In addition, all of the amounts (e.g., monetary amounts) of the payment card transaction authorization requests that are in each time period can be totaled together, yielding a single value representing the total amount (e.g., the total dollar value) for the payment card transaction authorization requests within the merchant profiling time period for the merchant, merchant bank, merchant category, or other grouping of merchants associated with the data represented on the graph. Moreover, all of the payment card transaction authorization requests that are in each time period and which have already been declined or rejected can be counted, yielding a single value representing how many declined payment card transaction authorization requests arrived within the merchant profiling time period for the merchant, merchant bank, merchant category, or other grouping of merchants associated with the data represented on the graph. Additional or alternative cumulative metrics for the payment card transaction authorization requests in each time period may also be calculated. In some embodiments, the merchant profiling engine reweights the individual transaction fraud score for each of the scored payment card transaction authorization requests based on the cumulative merchant profiling metrics for the merchant group associated with the merchant identified in the scored payment card transaction authorization request.

In an embodiment, the fraud analysis computing system includes a ratio striping engine that generates an account range profile using data regarding scored payment card transaction authorization requests that include an account number within a specified range of account numbers. The specified range of account numbers, such as primary account numbers (PANs) associated with each cardholder account, selected for analysis may be referred to as an "account range" and may be associated with current activity at a particular payment card issuer. For example, the account range includes all PANs associated with the Bank Identification Number (BIN) of a particular issuer, or a subset of PANs associated with the particular issuer, for example within a particular geographic region.

The process of the ratio striping engine may be visualized on several graphs. Each graph shows data regarding payment card transaction authorization requests for an account range. The graph has an x-axis graduated in units of time and a y-axis graduated in units of reweighted fraud score. The incoming reweighted payment card transaction authorization requests are displayed on the graph, metrics associated with the payment card transaction authorization requests in different zones of the graph are tracked, and ratios of the metrics are computed and processed to detect fraud across the account range. Within each zone, for example, the ratio striping engine tallies the number of reweighted payment card transaction authorization requests within the zone and determines the total value of the amounts (e.g., monetary amounts) of the reweighted payment card transaction authorization requests within the zone.

The zones may be defined by vertically extending lines intersecting the x-axis, defining ratio striping time periods whose duration is predetermined or selectable, and by horizontally extending reweighted fraud score range stripes that intersect the y-axis of the graph. The time periods each extend back over a respective predetermined interval from a common ratio striping starting point on the right-hand side of the x-axis, and thus overlap one another. The ratio striping time periods may correspond to, or alternatively differ from, the merchant profiling time periods used by the merchant profiling engine. In one example, during routine surveillance of the incoming reweighted payment card transaction authorization requests, the ratio striping time periods may be set at certain fixed intervals. For example, the time periods could include six fixed intervals, which are fixed to look at time durations immediately previous to a particular time (e.g., the present time or a time associated with a payment card transaction authorization request), with lengths of 15 minutes, 1 hour, 6 hours, 24 hours, 7 days, and 28 days. During a suspected fraud attack, the duration of the ratio striping time periods may be modified "on-the-fly" to provide data that the ratio striping engine needs to fully ascertain parameters of the fraud attack. The fraud score stripes may also overlap one another.

The zones may each be an area of the graph defined by a particular ratio striping time period and a particular reweighted fraud score range stripe, that is, by the intersection of one of the time periods and one of the fraud score range stripes. When the reweighted payment card transaction authorization requests are plotted on the graph, each will be in at least one of the zones of the graph. All the instances of the reweighted payment card transaction authorization requests that are in each zone can be tallied together, yielding a single value representing how many payment card transaction authorization requests of a certain reweighted fraud score range arrived within a certain time period for account numbers within the account range associated with the data represented on the graph. In addition, all of the amounts (e.g., monetary amounts) of the reweighted payment card transaction authorization requests that are in each zone can be totaled together, yielding a single value representing the total amount (e.g., the total dollar value) for the payment card transaction authorization requests within a certain reweighted fraud score range that arrived within a certain time period for account numbers within the account range associated with the data represented on the graph. Additional or alternative cumulative metrics for the reweighted payment card transaction authorization requests in each zone may also be calculated.

Although the zones are described above as being defined graphically, in some embodiments the zones for each account range are defined and/or tracked by storing and parsing account range data structures in a computer memory for each account range, without graphically displaying the zones and reweighted authorization requests.

Ratios developed from each metric, such as the tallies and totals, for any selected two of the time periods in a given reweighted fraud score range stripe may reveal information that helps detect fraud. For example, a ratio of two tallies of reweighted payment card transaction authorization requests from the same stripe over different time periods reveals a change in payment card transaction authorization requests of similar reweighted fraud scores over the two time periods within the range of account numbers associated with the data represented on the graph. For another example, a ratio of two total values of amounts of payment card transaction authorization requests from the same stripe over different time periods reveals a change in the total amount for the payment card transaction authorization requests of similar reweighted fraud scores over the two time periods for the range of account numbers associated with the data represented on the graph.

As used herein, "ratio striping value" may refer to any ratio of tallies, totals, or other suitable metric across a reweighted fraud score range stripe over two ratio striping time periods, such as the above. Ratio striping values may be a confirmation of a suspected fraud attack determined by, for example, an upstream fraud detection model, or may provide additional information for a second or subsequent payment card fraud analysis. Notably, because each time period extends back from a common point in time and the denominator time period extends back farther, the ratio striping values will always lie on a scale from 0 to 1, and thus are "pre-conditioned" to serve as useful inputs into a machine learning algorithm. For example, if a ratio striping value is taken for authorization requests having reweighted fraud scores within a given fraud score range in the previous six hours as compared to over the previous twenty-four hours, any authorization requests for the fraud stripe in the previous six hour zone must also fall within the fraud stripe for the previous twenty-four hour zone, causing the ratio of the two values to fall on a scale from 0 to 1. The closer to a value of "1" the ratio is, the more likely it may be that a pattern of coordinated or otherwise related fraud attempts has begun. Moreover, tracking such an uptick in tallies and/or cumulative transaction amounts can detect fraud quickly even when the individually scored payment card transaction authorization requests are in a low-fraud-score stripe (e.g., when the type of fraud being perpetrated on on-line merchants in a particular category is one in which few indicia of fraud are present in the characteristics of the individual transactions taken separately).

The process of the ratio striping engine is useful in at least two ways in the analysis of the incoming payment card transaction authorization requests. Once the ratio striping described above is complete, the ratio striping data may be used directly for trending and/or pattern recognition analysis to facilitate identifying a fraud attack across an account range. The results of the trending and pattern recognition analysis may be output directly to an operator dashboard or transmitted to downstream analysis components or a fraud management system located remotely from the fraud analysis computing system. In addition, the ratios of the metrics for two zones may be used to generate feature inputs to a downstream fraud detection model, such as one that applies machine learning algorithms.

This fraud analysis computing system and method increases the effectiveness of payment card fraud detection. First a fraud risk scoring model processes the incoming payment card transaction authorization requests individually to assess a preliminary fraud risk score. The scored payment card transaction authorization requests, or some scored subset of the payment card transaction authorization requests, is transmitted to the merchant profiling engine for additional processing and reweighting at the merchant group level. The output of the merchant profiling engine is forwarded on to the ratio striping engine for additional processing at the account range level to facilitate detection of, for example, fraud arising from the compromise of account data held at the issuer level.

Further, in some embodiments, a notification system may be triggered by a combination of one or more threshold-based alerts (e.g., alerts indicating the presence of multiple real-time, non-correlated statistical anomalies). For example, the system may provide a visual, email, text message, or other notification to analysts when a change in fraudulent transaction velocity has increased over certain time periods.

The technical problems addressed by this system include at least one of: (i) undetected network-based fraud events on a payment card transaction network, especially those targeted at accounts issued by a specific issuer; (ii) increased network load based on some types of fraud events; (iii) computational burdens imposed by automated fraud monitoring systems; (iv) too little contrast between fraudulent transactions and legitimate transactions in some time frames to make detection possible. Other technical problems addressed by the system and methods described herein may include increased network usage (slowing down the network) due to undetected frauds (e.g., systematic attacks to determine card verification numbers through trial and error).

The methods and systems described herein may be implemented using computer programming or engineering techniques including computer software, firmware, hardware, or any combination or subset thereof, wherein the technical effects may be achieved by performing at least one of the following steps: (a) receiving a plurality of scored payment card transaction authorization requests originating from a plurality of merchants; (b) generating, for each of a plurality of merchant groups of the plurality of merchants, at least one cumulative merchant profiling metric from the scored payment card transaction authorization requests over at least one merchant profiling time period; (c) calculating a reweighted fraud score for each of the scored payment card transaction authorization requests based on the corresponding preliminary fraud score and the at least one cumulative merchant profiling metric for the associated merchant group; (d) generating a plurality of reweighted payment card transaction authorization requests; (e) generating, for each of a plurality of account ranges, a respective account range data structure, wherein each account range data structure includes the reweighted payment card transaction authorization requests having the account number within the corresponding account range, and wherein each account range data structure sorts the reweighted payment card transaction authorization requests within the associated account range over a plurality of fraud score range stripes based on the corresponding reweighted fraud score; (f) parsing each of the account range data structures over a plurality of ratio striping time periods; (g) calculating, for each of the ratio striping time periods, at least one cumulative account range metric from the reweighted payment card transaction authorization requests associated with each of the fraud score range stripes; (h) determining a plurality of ratio striping values of the at least one cumulative account range metric across pairs of time periods; and (i) detecting a fraud event associated with the account range based on the ratio striping values.

The resulting technical effect achieved by this system is at least one of: (i) reducing network-based fraud events through early detection; (ii) reducing network-based fraud events through multiple fraud detection methods; (iii) applying both individual transaction fraud scoring and a cumulative fraud detection model to payment card authorization requests associated with a particular range of account numbers prior to forwarding of the authorization requests to an issuer; (iv) enabling visual network data views to detect fraud events; and (v) eliminating economic loss through, e.g., early detection and reaction to fraudulent network events. Thus, the system enables enhanced fraud detection on the payment card transaction network. Once a pattern of fraudulent activity is detected and identified, further fraudulent payment card transaction attempts may be reduced or isolated from further processing on the payment card interchange network, which results in a reduced amount of fraudulent network traffic and reduced processing time devoted to fraudulent transactions, and thus a reduced burden on the network.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a "processor" may include any programmable system including systems using central processing units, microprocessors, micro-controllers, reduced instruction set circuits (RISC), application specific integrated circuits (ASICs), logic circuits, and any other circuit or processor capable of executing the functions described herein.

The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable payment card, such as a credit card, a debit card, a prepaid card, a charge card, a membership card, a promotional card, a frequent flyer card, an identification card, a prepaid card, a gift card, and/or any other payment device that may hold payment account information, such as mobile phones, Smartphones, personal digital assistants (PDAs), key fobs, and/or computers. Each type of payment device can be used as a method of payment for performing a transaction.

As used herein, the term "fraud" is used in the context of payment card transactions and refers, generally, to an unprivileged use of a payment card. For example, a thief may steal a consumer's payment card or information from that payment card (e.g., a payment account number [PAN], expiration date, security code) and attempt to use the payment card for purchases. This type of transaction may be monitored by, for example, a fraud detection system within a payment network. Further, as used herein, a "suspected fraudulent transaction" is a payment card transaction that is suspected to be fraudulent, but which has not yet been confirmed as fraudulent by, for example, the consumer of the underlying payment card, or the issuing bank, or an analyst associated with the fraud detection system.

As used herein, the term "real-time" is used, in some contexts, to refer to a regular updating of data within a system such as the fraud detection systems, the fraud management systems, and/or the displays described herein. When a system is described as processing or performing a particular operation "in real-time," this may mean within seconds or minutes of an occurrence of some trigger event, such as new data being generated, or on some regular schedule, such as every minute. In other contexts, some payment card transactions require "real-time" fraud operations, such as fraud scoring, which refers to operations performed during authorization of a payment card transaction (i.e., between the moment that a new payment card transaction is initiated from, for example, a merchant, and the time that an authorization decision is made, for example, back to that merchant). In such a context, "near real-time" fraud operations are operations conducted shortly after the payment card transaction has occurred (i.e., after an authorization decision is made).

As used herein, the term "transaction velocity" is used to generally relate to a number of qualifying transactions initiated by one or more consumers using one or more payment devices, where the transactions qualify if they meet one or more qualifying criteria (e.g., happening within a certain period of time, having a fraud score within a certain fraud score range).

The following detailed description illustrates embodiments of the disclosure by way of example and not by way of limitation. It is contemplated that the disclosure has general application to fraud management of payment card transactions.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 3:
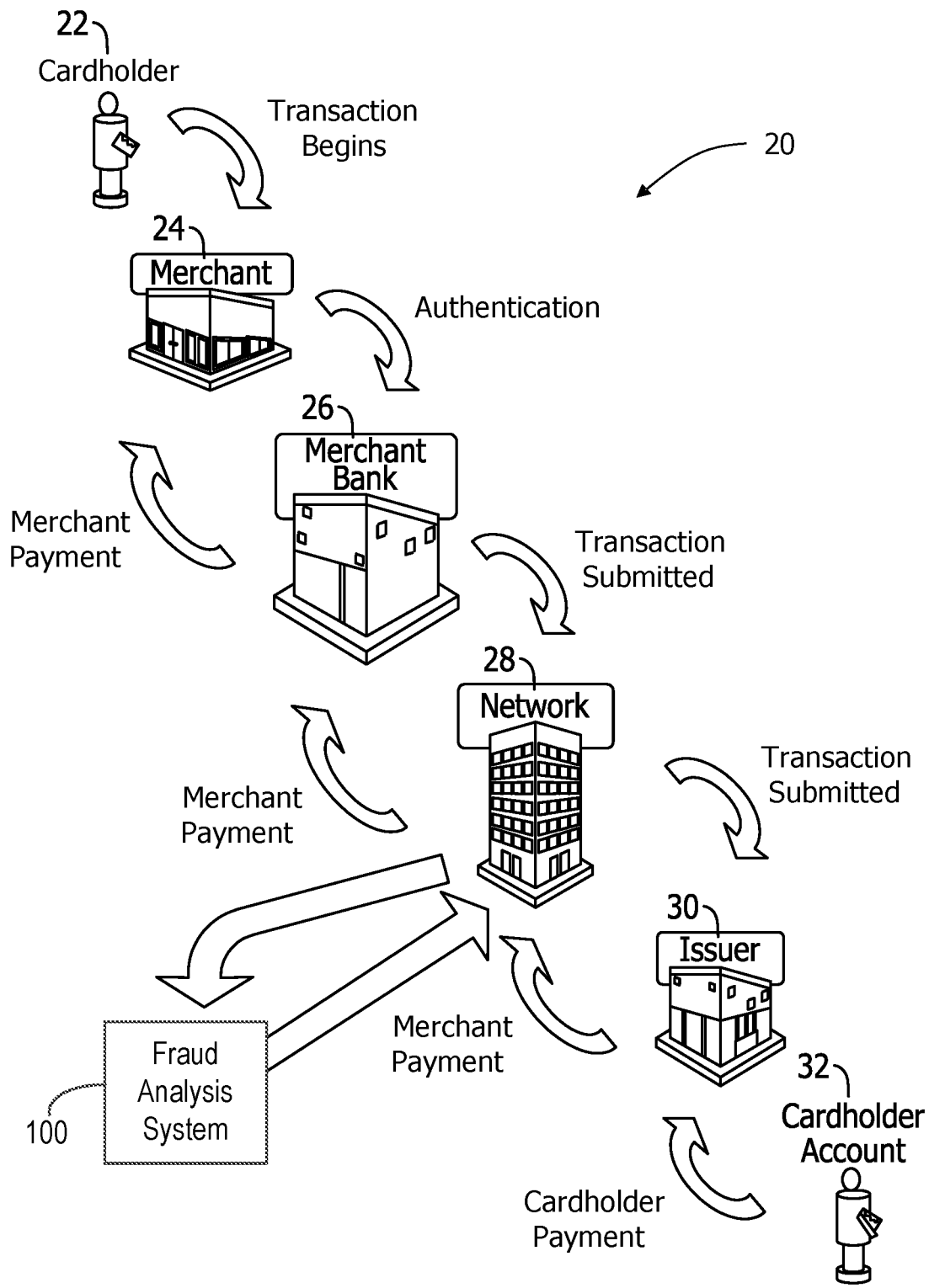

FIG. 1 is a schematic block diagram of a fraud analysis computing system 100 for detecting fraudulent network events in a payment card interchange network, such as payment card interchange network 28 (shown in FIG. 3). For example, fraudsters may introduce fraudulent transactions through a merchant 24 in an attempt to deceive an issuer 30 into authorizing a transaction with a payment card that is not owned and/or controlled by the person presenting the payment card at a time of purchase. Such transactions may be monitored for fraudulent activity.

Fraudulent transactions may strain the processing and network resources of payment card interchange network 28. For example, some types of attempted fraud include a large number of attempted online transactions in a short period of time, which may limit a bandwidth of payment card interchange network 28 that is available for legitimate transactions. For another example, fraudulent transactions that are not detected prior to authorization by issuer 30 may result in additional activity over payment card interchange network 28 such as voids, rollbacks of cleared and settled transactions, and so forth, which may reduce processing speed and bandwidth available for legitimate transactions.

In the example embodiment, fraud analysis computing system 100 includes a first fraud detection model 102 communicatively coupled to a plurality of merchants 24 directly or through at least one merchant bank 26. A merchant profiling engine 104, including a processor 105, is communicatively coupled to first, or upstream, fraud detection model 102 and is configured to generate a plurality of merchant profiling data structures 106. In some embodiments, fraud analysis computing system 100 also includes a second fraud detection model 108 communicatively coupled to merchant profiling engine 104. A ratio striping engine 110, including a processor 115, is communicatively coupled (e.g., either directly or via second fraud detection model 108) to merchant profiling engine 104 and is configured to generate a plurality of account range data structures 130. In certain embodiments, fraud analysis computing system 100 also includes a third fraud detection model 114 communicatively coupled to ratio striping engine 110. In some embodiments, two or more of first fraud detection model 102, merchant profiling engine 104, second fraud detection model 108, ratio striping engine 110, and third fraud detection model 114 are implemented on a common computing platform. In alternative embodiments, each of first fraud detection model 102, merchant profiling engine 104, second fraud detection model 108, ratio striping engine 110, and third fraud detection model 114 are implemented on separate computing platforms and coupled together in electronic communication.

First fraud detection model 102 is configured to receive a plurality of payment card transaction authorization requests 116 from plurality of merchants 24 either directly or from the at least one merchant bank 26. Each payment card transaction authorization request 116 includes an account number associated with a payment card account used in the underlying transaction. In various embodiments, payment card transaction authorization requests 116 are received by payment card interchange network 28 (shown in FIG. 3) and forwarded to first fraud detection model 102. First fraud detection model 102 is configured to analyze each of the received plurality of payment card transaction authorization requests 116 on an individual basis (that is, without regard to characteristics of other incoming payment card transaction authorization requests) for fraud, and to assign a preliminary fraud score to each of the plurality of payment card transaction authorization requests 116. The preliminary fraud score is indicative of a likelihood of fraud being associated with a respective one of the payment card transaction authorization requests 116.

The preliminarily scored payment card transaction authorization requests 118 are transmitted to merchant profiling engine 104. Merchant profiling engine 104 is configured to sort the preliminarily scored payment card transaction authorization requests 118 by selected merchant groups. Each merchant group may be defined to include one or more merchants 24, merchant bank 26, all merchants in a selected merchant category, or another pre-selected grouping of merchants. It should be understood that a "merchant group" may be defined to include only a single merchant. Moreover, for each merchant 24, merchant bank 26, merchant category, or other grouping of merchants, merchant profiling engine 104 is configured to generate a respective data structure 106 that includes the preliminarily scored payment card transaction authorization requests 118 associated with the respective merchant group.

Merchant profiling engine 104 is further configured to parse each data structure 106 over a plurality of time periods and calculate, for each of the time periods, at least one cumulative metric from the preliminarily scored payment card transaction authorization requests 118. The merchant profiling engine 104 is configured to generate the merchant profile from the at least one cumulative metric. In the example embodiment, data structure 106 for each merchant 24, merchant bank 26, merchant category, or other grouping of merchants is parsed to determine a tally of each payment card transaction authorization request within each of the plurality of time periods. In the example embodiment, data structure 106 for each merchant 24, merchant bank 26, merchant category, or other grouping of merchants also is parsed to determine a cumulative total of the transaction amounts of each payment card transaction authorization request within each of the plurality of time periods.

In the example embodiment, as large numbers of preliminarily scored payment card transaction authorization requests 118 continue to be received by merchant profiling engine 104, the common starting point of the time periods used by merchant profiling engine 104 is updated to a more recent time in order to consider the most recent payment card transaction authorization requests in the fraud analysis. Due to the structure of data structures 106, merchant profiling engine 104 simply re-parses existing data structures 106 for each merchant 24, merchant bank 26, merchant category, or other grouping of merchants, rendering the merchant profile derived therefrom amenable to rapid storage, calculation, and updating. The use of data structures 106 thus provides an advantage over at least some known fraud detection systems. In some embodiments, older preliminarily scored payment card transaction authorization requests 118 are correspondingly purged from data structure 106 as they age out of the longest merchant profiling time period that merchant profiling engine 106 is configured to consider. In addition, the use of separate data structures 106 for each merchant 24, merchant bank 26, merchant category, or other grouping of merchants including the tally and total as described above also reveal information that is particularly helpful in scoring payment card transaction authorization requests for use by ratio striping engine 110, as described below. In alternative embodiments, merchant profiling engine 104 is configured to parse data structure 106 for each merchant 24, merchant bank 26, merchant category, or other grouping of merchants to obtain any suitable combination of these or other metrics derived for payment card transaction authorization requests within each of the plurality of time periods. For example, data structure 106 for each merchant 24, merchant bank 26, merchant category, or other grouping of merchants further is parsed to determine a count of the declined payment card transaction authorization requests within each of the plurality of time periods, "declined" payment card transaction authorization requests being those that are declined or rejected by an issuing bank, such as issuer 30.

In the example embodiment, merchant profiling engine 104 is further configured to calculate a reweighted fraud score for each preliminarily scored payment card transaction authorization request 118 based on the corresponding preliminary fraud score and the at least one cumulative merchant profiling metric for the merchant group associated with the scored payment card transaction authorization request 118. For example, an increase in the tally cumulative metric for the merchant group over a merchant profiling time period may indicate a potential coordinated high-speed, low-dollar-amount attack on a particular merchant 24 or grouping of similar merchants 24, and the preliminary fraud scores for payment card transaction authorization requests 118 originating from such merchants 24 are correspondingly reweighted upward to reflect the risk that such an attack may be underway. For another example, an increase in the amount cumulative metric for the merchant group over a merchant profiling time period may indicate a potential coordinated high-dollar-amount attack on a particular merchant 24 or grouping of similar merchants 24, and the preliminary fraud scores for payment card transaction authorization requests 118 originating from such merchants 24 are correspondingly reweighted upward to reflect the risk that such an attack may be underway. Merchant profiling engine 104 generates a plurality of scored payment card transaction authorization requests 112 each including a respective payment card transaction authorization request 116 along with the corresponding reweighted fraud score (e.g., the reweighted fraud score replaces, or is included in addition to, the preliminary fraud score). It should be understood that for at least some scored payment card transaction authorization requests 112, the reweighted fraud score may be unchanged from the preliminary fraud score generated by first fraud model 102.

In certain embodiments, merchant profiling engine 104 is further configured to provide feature inputs 120, including at least the merchant profile and preliminarily scored payment card transaction authorization requests 118, for use by second fraud detection model 108. The set of feature inputs 120 are used by second fraud detection model 108 to detect fraud patterns at the merchant group level. In some embodiments, second fraud detection model 108 includes a plurality of machine learning algorithms 124. In various embodiments, machine learning algorithms 124 may be selectable, either automatically or by an operator, and may include at least one of an Artificial Neural Network (ANN) machine learning algorithm and a Support Vector Machine (SVM) machine learning algorithm. Second fraud detection model 108 may be configured to execute multiple machine learning algorithms 124 singly or simultaneously in groups. Feature inputs 120 affect the operation of second fraud detection model 108 by changing parameters of second fraud detection model 108 that are applied to preliminarily scored payment card transaction authorization requests 118. In other words, operation of second fraud detection model 108 changes based on the generated set of feature inputs, that is, as the generated set of feature inputs 120 changes. For example, feature inputs 120 are used to train machine learning algorithms 124. In some embodiments, feature inputs 120 generated by merchant profiling engine 104 are used to adjust node weights applied by second fraud detection model 108 to external inputs (e.g., scored payment card transaction authorization requests 118) to, or internal signals (e.g., intra-node signals) within, the machine learning algorithm. Additionally or alternatively, feature inputs 120 are provided as input signals into machine learning algorithms 124. Second fraud detection model 108 is configured to perform at least one of: alerting merchant 24, merchant bank 26, merchant category, or other grouping of merchants associated with a particular data structure 106 to a potential ongoing coordinated fraud attempt; calculating reweighted fraud scores for the scored payment card transaction authorization requests based on at least one of the preliminary fraud scores and feature inputs 120, prior to forwarding the payment card transaction authorization requests to issuer 30; generating an approve or decline recommendation for a payment card transaction authorization request based on at least one of a preliminary fraud score, a reweighted fraud score, and feature inputs 120; flagging payment card transaction authorization requests 116 associated with merchant 24, merchant bank 26, merchant category, or other grouping of merchants associated with the particular data structure 106 associated with the potential ongoing coordinated fraud attempt for other special handling; generating a machine learning feedback signal 132; and applying machine learning feedback signal 132 to at least one of machine learning algorithms 124 and merchant profiling engine 104. Alternatively, fraud analysis computing system 100 does not include second fraud detection model 108 and/or merchant profiling engine 104 does not generate feature inputs 120.

Ratio striping engine 110 receives scored payment card transaction authorization requests 112 each including a corresponding payment card transaction authorization request 116, which may include only an operative subset of information as discussed above, along with a respective fraud score. In the example embodiment, the respective fraud score is the reweighted fraud score generated by merchant profiling engine 102 as described above, and the scored payment card transaction authorization requests 112 are transmitted from merchant profiling engine 102. In alternative embodiments, the fraud score included in scored payment card transaction authorization requests 112 is generated in any suitable fashion and/or ratio striping engine 110 receives scored payment card transaction authorization requests 112 from any suitable source in communication with payment card interchange network 28.

Ratio striping engine 110 is configured to sort the scored payment card transaction authorization requests 112 into one or more separate account ranges based on the respective account number associated with the scored payment card transaction authorization requests 112. Each account range may be defined to include a range of account numbers associated with a particular issuer 30, such as those based on a given bank identification number (BIN); a subset of account ranges associated with a particular issuer 30; or another grouping of accounts. Scored payment card transaction authorization requests 112 in each account range may be further grouped by transaction channel. For example, a transaction channel may be defined to include point of sale (POS) terminal payments, automated teller machine (ATM) withdrawals, card-not-present transactions, transactions that occurred in a particular geographic region, or another subset of the global transaction stream. Moreover, for each selected account range and, in some cases, each selected transaction channel, ratio striping engine 110 is configured to generate a respective account range data structure 130 that sorts the scored payment card transaction authorization requests 112 over a plurality of fraud score range stripes. Each of the fraud score range stripes ranges from an upper fraud score threshold to a lower fraud score threshold. In some embodiments, at least two of the fraud score range stripes overlap, such that a particular reweighted payment card transaction authorization request may be stored in two locations in the corresponding data structure 106.

Ratio striping engine 110 is further configured to parse each account range data structure 130 over a plurality of ratio striping time periods and calculate, for each of the time periods, at least one cumulative ratio striping metric from the scored payment card transaction authorization requests 112. In addition, ratio striping engine 110 is configured to determine a ratio of a first value of the metric in a first fraud score range stripe from a first ratio striping time period with respect to a second value of the ratio striping metric in the first fraud score range stripe during a second time period, wherein the second time period extends back farther in time than the first time period (i.e., a ratio striping value for the first and second time periods for the particular reweighted fraud score range stripe).

In the example embodiment, data structure 130 is parsed to determine a tally of each scored payment card transaction authorization request 112 within each fraud score range stripe over each of the plurality of ratio striping time periods. Ratio striping engine 110 is also configured to determine a plurality of ratio striping values of a first tally in a first stripe from a first time period with respect to a second tally in the first stripe during a second time period.

In the example embodiment, each data structure 130 also is parsed to determine a cumulative total of the transaction amounts of each scored payment card transaction authorization request within each fraud score range stripe over each of the plurality of ratio striping time periods. Ratio striping engine 110 is also configured to determine a plurality of ratio striping values of a first total in a first stripe from a first time period with respect to a second total in the first stripe during a second time period.

In the example embodiment, as large numbers of scored payment card transaction authorization requests 112 continue to be received by ratio striping engine 110, the common starting point of the ratio striping time periods used by ratio striping engine 110 is updated to a more recent time in order to consider the most recent payment card transaction authorization requests in the fraud analysis. Due to the structure of the at least one account range data structure 130, ratio striping engine 110 simply re-parses existing account range data structures 130, rendering the ratio striping values derived therefrom amenable to rapid storage, calculation, and updating, enabling detection of fraud associated with ranges of account numbers to be updated frequently, and in some embodiments in near real time. The use of the at least one account range data structure 130 thus provides an advantage over at least some known fraud detection systems. In some embodiments, the use of separate data structures 130 for scored payment card transaction authorization requests 112 having account numbers within specified ranges also reveals information that is particularly helpful in detecting fraud affecting a particular issuer 30.

In alternative embodiments, ratio striping engine 110 is configured to parse the at least one account range data structure 130 to obtain any suitable combination of these or other metrics derived for scored payment card transaction authorization requests 112 within each fraud score range stripe over each of the plurality of time periods, and ratio striping engine 110 is also configured to determine a plurality of ratios of a first value of each metric in a first stripe from a first time period with respect to a second value in the first stripe during a second time period.

Ratio striping engine 110 is further configured to detect a fraud event associated with at least one of the account ranges based on the ratio striping values determined for the corresponding account range data structure 130. For example, ratio striping engine 110 is configured to calculate the tally and amount cumulative metrics for each account range over a first ratio striping time period of 6 hours and over a second ratio striping time period of 24 hours. Ratio striping engine 110 then determines, for one of the account ranges, a ratio striping value of greater than 0.4 (i.e., ratio of the metric in the first time period to the metric in the second time period in a particular reweighted fraud score range stripe) for one or both metrics. On the basis of the relatively high ratio striping value, ratio striping engine 110 determines that account data from a particular issuer 30 associated with the corresponding account range may have been compromised and that account numbers in that range are beginning to be exploited for fraudulent activity.

In some embodiments, ratio striping engine is configured to perform, in response to detecting the fraud event associated with at least one of the account ranges, at least one of: alerting the issuer 30 associated with the account range to a potential data compromise; adjusting fraud scores for the scored payment card transaction authorization requests 112 to reflect the determined risk, prior to forwarding the payment card transaction authorization requests to issuer 30; generating an approve or decline recommendation for a payment card transaction authorization request based on the determined risk; and flagging payment card transaction authorization requests 116 associated with issuer 30 associated with the account range for other special handling In certain embodiments, ratio striping engine 110 is further configured to provide feature inputs 126 for a third fraud detection model 114 based on the determined plurality of ratio striping values. The set of feature inputs 126 are used to update or modify parameters of third fraud detection model 114 applied to scored payment card transaction authorization requests 112, further facilitating the identification of potential occurrences of multiple related payment card transaction fraud attempts over payment card interchange network 28 (shown in FIG. 3). In some embodiments, third fraud detection model 108 includes a plurality of machine learning algorithms 128. In various embodiments, machine learning algorithms 128 may be selectable, either automatically or by an operator, and may include at least one of an Artificial Neural Network (ANN) machine learning algorithm and a Support Vector Machine (SVM) machine learning algorithm. Third fraud detection model 114 may be configured to execute multiple machine learning algorithms 128 singly or simultaneously in groups.

Feature inputs 126 affect the operation of third fraud detection model 114 by changing parameters of second fraud detection model 108 that are applied to scored payment card transaction authorization requests 112. In other words, operation of third fraud detection model 114 changes based on the generated set of feature inputs, that is, as the generated set of feature inputs 126 changes. For example, feature inputs 126 are used to train machine learning algorithms 128. In some embodiments, feature inputs 126 generated by ratio striping engine 110 are used to adjust node weights applied by third fraud detection model 114 to external inputs (e.g., scored payment card transaction authorization requests 112) to, or internal signals (e.g., intra-node signals) within, the machine learning algorithm. Additionally or alternatively, feature inputs 126 are provided as input signals into machine learning algorithms 128. Third fraud detection model 114 is configured to perform at least one of: alerting issuers, cardholders, and/or merchants to a potential ongoing coordinated fraud attempt; generating an approve or decline recommendation for a payment card transaction authorization request based on at least one of a preliminary fraud score, a reweighted fraud score, and feature inputs 126; flagging payment card transaction authorization requests 116 associated with the potential ongoing coordinated fraud attempt for other special handling; generating a machine learning feedback signal 134; and applying machine learning feedback signal 134 to at least one of machine learning algorithms 128 and ratio striping engine 110. In the example embodiment, after scored payment card transaction authorization requests 112 are processed by third fraud detection model 114, the corresponding payment card transaction authorization requests 116 are modified to include, for example, the accept/decline recommendation generated by third fraud detection model 114, and routed to issuer 30 (e.g., via payment card interchange network 28 shown in FIG. 3) as re-assessed payment card transaction authorization requests 119.

In some embodiments, the use of the ratio striping values to generate feature inputs 126 for third fraud detection model 114 further increases a processing speed of computing system 100. For example, the time periods used to define data structures 130 are selected as progressively longer time bands extending backward in time from a common starting point, such as the current time or the time stamp of a payment card transaction authorization request currently being processed, causing each of the ratio striping values as generated to lie between 0 and 1. Values ranging between 0 and 1 are easily conditioned to serve as feature inputs 126

(e.g., node weights) for machine learning algorithms 128, thus avoiding a need for time- and resource-consuming additional processing by ratio striping engine 110 to generate feature inputs 126. In some embodiments, feature inputs 126 are set to equal the ratio striping values, such that the ratio striping values are provided directly to third fraud detection model 114. In other such embodiments, ratio striping engine 110 provides limited additional conditioning of the ratio striping values to generate feature inputs 126, such as by squaring each of the ratio striping values to generate corresponding feature inputs 126. For example, the further conditioning, such as by squaring the values, facilitates increasing a stability of feature inputs 126, by reducing an effect of transient spikes in the ratio striping values on the value of the corresponding feature inputs 126. In alternative embodiments, feature inputs 126 are calculated from the ratio striping values in any suitable fashion.

In some embodiments, fraud analysis computing system 100 is configured to operate ratio striping engine 110 over a first time segment using a first set of time periods and/or fraud stripe ranges to generate the plurality of ratio striping values, and in response to machine learning feedback signal 134 at the end of the first time segment, to select a second set of time periods and/or fraud stripe ranges to generate the plurality of ratio striping values going forward after the end of the first time segment. In alternative embodiments, ratio striping engine 110 selects a different set of time periods and/or fraud stripe ranges in response to a signal originating from an operator of fraud analysis computing system 100 (e.g., based on the operator's viewing of graphical user interface 150), automatically from another component of fraud analysis computing system 100, or from an external system or component.

In some embodiments, fraud analysis computing system 100 is configured to operate third fraud detection model 114 using a first machine learning algorithm 128, and then in response to machine learning feedback signal 134, to automatically switch to operating third fraud detection model 114 using a second machine learning algorithm 128. In alternative embodiments, the signal causing third fraud detection model 114 to switch among machine learning algorithms 128 originates from an operator of fraud analysis computer system 100 (e.g., based on the operator's viewing of graphical user interface 150), automatically from another component of fraud analysis computing system 100, or from an external system or component.

Figure 2:
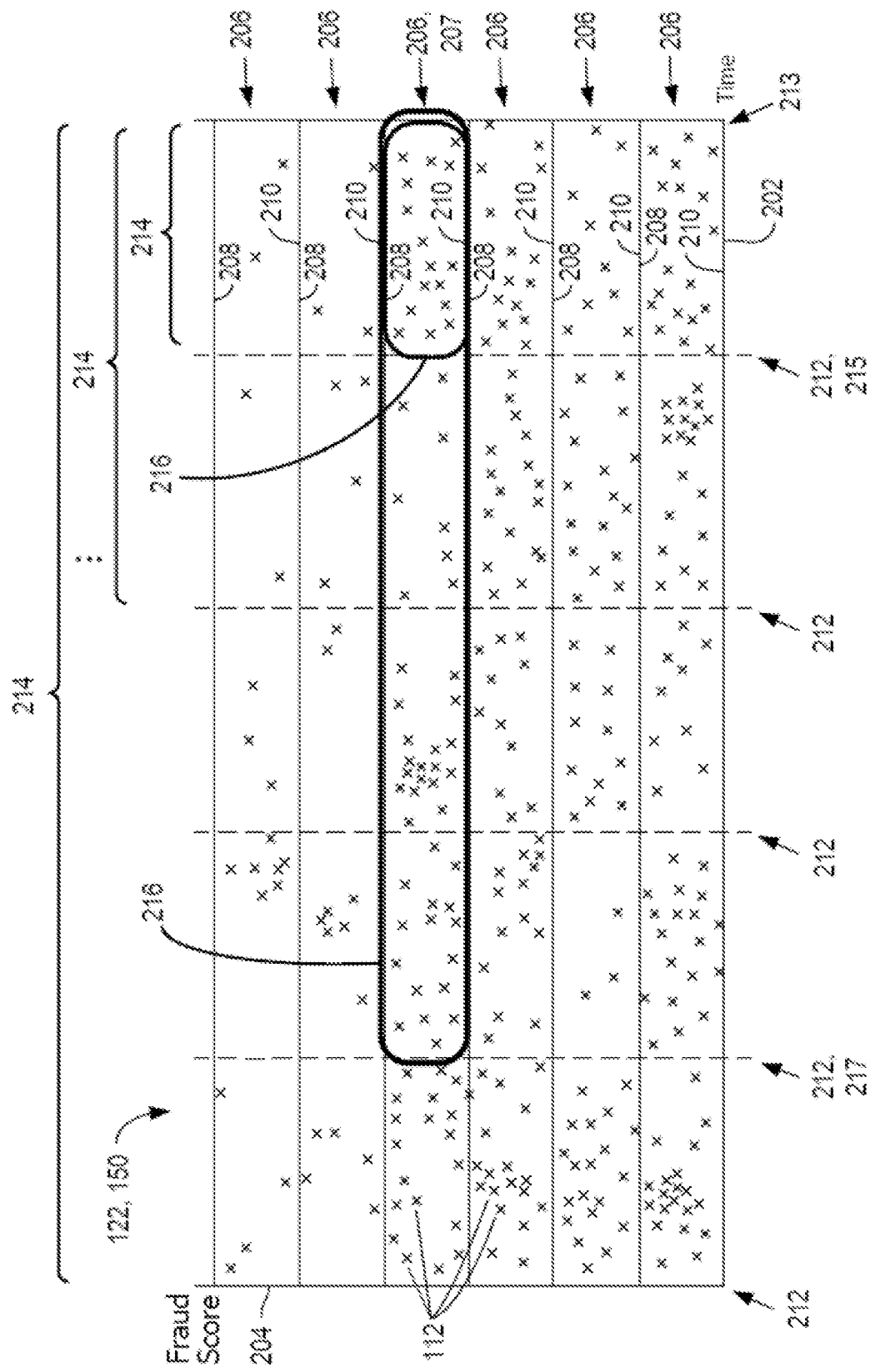

In various embodiments, fraud analysis computing system 100 further includes a graphical user interface 150 configured to display information to a user in real time through a dashboard application 136. FIG. 2 illustrates graph 122 displayed on graphical user interface 150. For example, graphical user interface 150 is displayable on a display screen of a client system 414 (shown in FIG. 4). With reference to FIGS. 1 and 2, in the example embodiment, graph 122 includes an x-axis 202 graduated in units of time and a y-axis 204 graduated in units of fraud score. Typically, fraud scores are presented on a 0-100 or 0-1000 unit scale. Graph 122 displays horizontal fraud score range stripes 206, each delineated by an upper fraud score threshold 208 and a lower fraud score threshold 210.

Graph 122 also displays vertically extending ratio striping time period boundaries 212 that intersect x-axis 202 and define a corresponding plurality of ratio striping time periods 214. More specifically, each time period 214 is defined from a current analysis time 213 back to one of ratio striping time period boundaries 212. In one example, during routine surveillance of the incoming scored payment card transaction authorization requests 112, ratio striping time boundaries may be set at certain fixed intervals with respect to current analysis time 213. For example, time period boundaries 212 could define six fixed intervals, which are fixed to look at time durations immediately previous to current analysis time 213 (e.g., the present time or a timestamp associated with a payment card transaction authorization request most recently added to data structures 106), with lengths of 15 minutes, 1 hour, 6 hours, 24 hours, 1 days, and 28 days. During a suspected fraud attack a location of ratio striping time period boundaries 212 may be modified "on-the-fly" to provide data that better enables ratio striping engine 110 or machine learning algorithms 124, 128 to ascertain parameters of the fraud attack.

In the example embodiment, ratio striping engine 110 provides for display on graph 122 each incoming scored payment card transaction authorization request 112 associated with a respective account range data structure 130. As time advances, new transactions are added at the right-hand side of graph 122, while older transactions scroll off of the left-hand side. Graph 122 thus provides a visual indication to a user of how the tally of payment card transaction authorization requests in each fraud score stripe 206 is changing over time. Moreover, in certain embodiments, a transaction amount associated with each plotted payment card transaction authorization request is represented proportionally by a size and/or color (e.g., ranging from blue or "cold" for smaller transaction amounts to red or "hot" for higher transaction amounts) of the symbol used on graph 122. In some embodiments, graphical user interface 150 enables the user to select among one or more metrics, and method of display of each metric, for display on graph 122. Thus, graphical user interface 150 provided by ratio striping engine 110 and/or dashboard application 136 enables the user to draw inferences about patterns of fraudulent activity that may be occurring with respect to the grouping of scored payment card transaction authorization requests 112 in account range data structure 130, even for payment card transaction authorization requests that have been scored individually as low fraud risks.

In alternative embodiments, ratio striping engine 110 does not provide graph 122. Nevertheless, graph 122 provides a useful visual illustration of zones 216 for which cumulative metrics, based on information in the scored payment card transaction authorization requests 112 in each fraud score stripe 206, are calculated by ratio striping engine 110 as discussed above. More specifically, data regarding scored payment card transaction authorization requests 112 stored in account range data structures 130 is parsed over each time period 214 for each fraud score stripe 206, and the cumulative metrics are calculated for the respective zone 216.

For purposes of illustration, two zones 216 are illustrated in FIG. 2. A first zone 216 extends from current analysis time 213 back to a first time period boundary 215, a second zone 216 extends from current analysis time 213 back to an earlier second time period boundary 217, and both zones are bounded within a particular fraud stripe 207 of the plurality of fraud stripes 206. For example, but not by way of limitation, first time period boundary 215 defines a backward-looking time interval of six hours and second time period boundary 217 defines a backward-looking time interval of twenty-four hours. Ratio striping engine 110 parses account range data structure 130 for payment card transaction authorization requests scored within fraud stripe 207 and time stamped between current analysis time 213 and first time period boundary 215. In the example embodiment, account range data structure 130 includes payment card transaction authorization requests pre-sorted into fraud stripes 206, enabling the time parsing process for the first and second illustrated zones 216 to operate solely on transactions within fraud stripe 207, thereby increasing a speed of the parsing process, which advantageously enables ratio striping engine 104 to continuously update the metrics for each zone 216 as time moves forward and the time stamps of payment card transaction authorization requests in each data structure 130 are correspondingly shifted across time period boundaries 212.

In the example embodiment, ratio striping engine 110 calculates the tally and total amount of the identified payment card transaction authorization requests and associates these metrics with the first zone 216. Similarly, ratio striping engine 110 parses the portion of account range data structure 130 that includes payment card transaction authorization requests scored within fraud stripe 207 to identify payment card transaction authorization requests that are time stamped between current analysis time 213 and second time period boundary 217. Ratio striping engine 104 calculates the tally and total amount of the identified payment card transaction authorization requests and associates these metrics with the second zone 216. In the example embodiment, ratio striping engine 110 further calculates the ratio striping values associated with fraud stripe 207, the first zone 216, and the second zone 216 as the ratio of the tally (i.e., number of transactions) in the first zone 216 to the tally in the second zone 216, and the ratio of the total amount of transactions in the first zone 216 to the total amount of transactions in the second zone 216. Ratio striping engine 104 may perform similar operations for each pair of time periods 214 within fraud stripe 207, and for each pair of the plurality of time periods 214 for other fraud stripes 206. It should again be noted that the speed advantages provided by sorting scored payment card transaction authorization requests 112 into account range data structures 130, and in some embodiments by further sorting the payment card transaction authorization requests in each account range data structure 130 by fraud stripe 206, enables ratio striping engine 110 to perform these operations in near real time for the extremely large number of payment card transaction authorization requests 116 that are processed by payment card interchange network 28.

One measurement of potential fraudulent activity directly uses the ratio striping values based on tallies and/or total values of payment card transaction authorization requests from the same fraud stripe 206 over a pair of time periods 214. For example, a ratio of the tallies from the first zone 216 to the second zone 216 reveals a change in payment card transaction authorization requests of similar fraud scores between the two time periods for the account range under consideration. As another example, a ratio of the total transaction amounts from the first zone 216 to the second zone 216 reveals a change in the total value of the amounts for payment card transaction authorization requests of similar fraud scores between the two time periods for the account range of scored payment card transaction authorization requests 112. The ratio striping values are useful in at least two ways. The ratio striping values by themselves may demonstrate trending and/or patterns that facilitate identifying a fraud attack on a particular issuer 30 or confirming a suspected fraud attack previously determined by, for example, an upstream fraud detection model. The results of the trending and pattern recognition analysis may be output directly to graphical user interface 150 or transmitted to downstream analysis components of fraud analysis computing system 100 or another fraud management system located remotely from fraud analysis computing system 100. Additionally or alternatively, the ratio striping values may provide the basis for inputs into a second or subsequent payment card fraud analysis, and are particularly well-suited to serve as inputs into machine learning algorithms, as described above with respect to third fraud model 114. In some embodiments, third fraud model 114 learns to detect underlying relationships between actual fraud events and ratio striping values associated with various zones 216 that may be difficult to detect by a human operator.

In some embodiments, as noted above, fraud analysis computing system 100 is implemented as part of, or in association with, a payment card interchange network 28. FIG. 3 is a schematic diagram illustrating an example multi-party payment card industry system 20 for enabling ordinary payment-by-card transactions in which merchants 24 and issuer banks 30 do not need to have a one-to-one special relationship. Embodiments described herein may relate to a payment card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical payment card system, a financial institution called the "issuer" 30 issues a payment card, such as a credit card, to a consumer or cardholder 22, who uses the payment card to tender payment for a purchase from merchant 24. To accept payment with the payment card, merchant 24 must normally establish an account with a financial institution that is part of the financial payment system. This financial institution is usually called the "merchant bank," the "acquiring bank," or the "acquirer." When cardholder 22 tenders payment for a purchase with a payment card, merchant 24 requests authorization from an acquirer or merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using payment card interchange network 28, computers of merchant bank 26 or merchant processor will communicate with computers of issuer bank 30 by sending a payment card transaction authorization request. Based on the payment card transaction authorization request, issuer 30 determines whether cardholder's 22 account 32 is in good standing and whether the purchase is covered by cardholder's 22 available credit line. Based on these determinations, the request for authorization will be declined or accepted by issuer 30. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card interchange network 28 and/or issuer bank 30 stores the payment card information, such as a type of merchant, amount of purchase, date of purchase, in a database 420 (shown in FIG. 4).

After a purchase has been made, a clearing process occurs to transfer additional transaction data related to the purchase among the parties to the transaction, such as merchant bank 26, payment card interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card interchange network 28, and then between payment card interchange network 28 and merchant bank 26, and then between merchant bank 26 and merchant 24.

In the example embodiment, payment card interchange network 28 routes payment card transaction authorization requests 116 through fraud analysis computing system 100 as described above. Detection of patterns of fraudulent activity may enable payment card interchange network 28 to identify and prevent fraudulent transactions prior to authorization by issuer 30, thereby improving transaction processing speed and bandwidth available for legitimate transactions. Fraud analysis computing system 100 may be configured to provide fraud data associated with payment card transactions to a downstream fraud management system (not shown) for further processing. Fraud analysis computing system 100 may be incorporated on one or more computing devices within payment card interchange network 28 or may be embodied in one or more separate components communicatively accessible to payment card interchange network 28.

Figure 4:
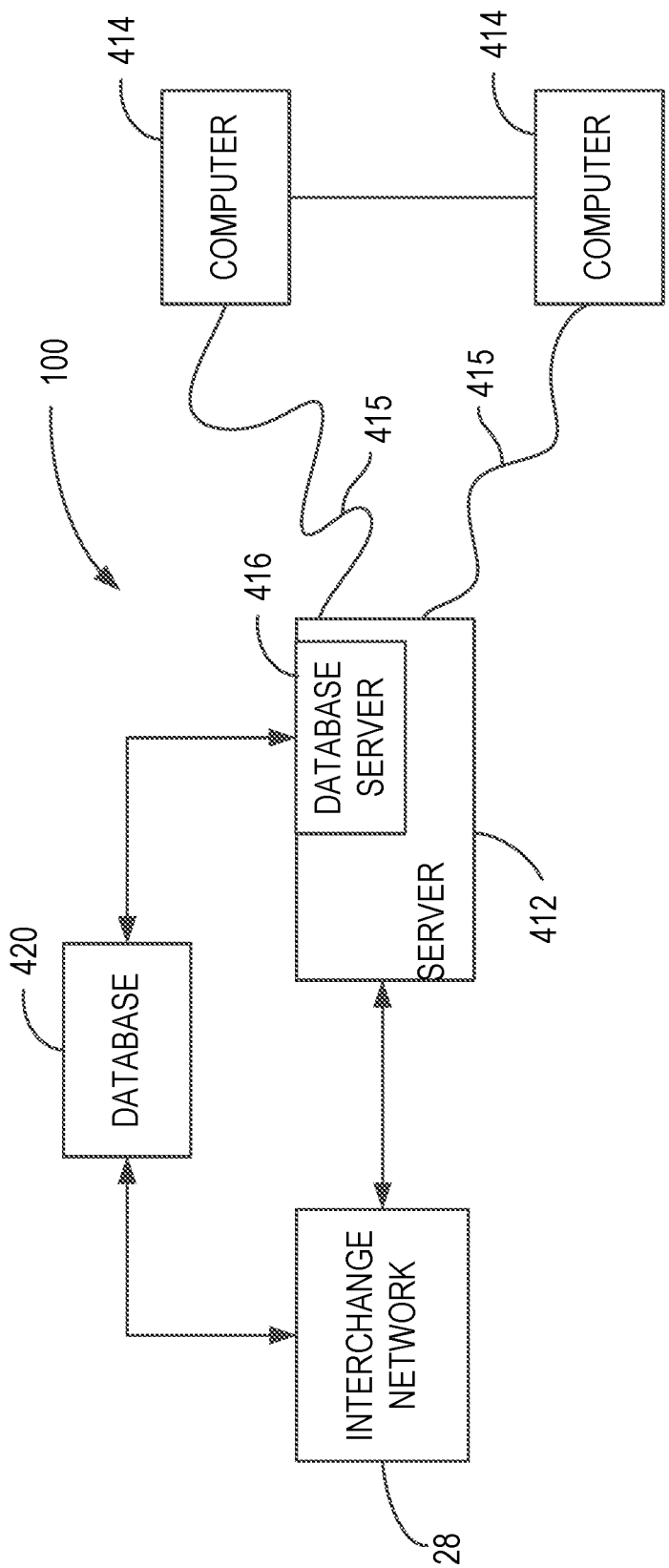

FIG. 4 is a simplified block diagram of an example fraud analysis computing system 100 in communication with payment interchange network 28 in accordance with one embodiment of the present disclosure. In the example embodiment, fraud analysis computing system 100 is implemented on a server system 412. A plurality of client systems 414 is connected to server system 412. In one embodiment, client systems 414 are computers including a web browser, such that server system 412 is accessible to client systems 414 using the Internet. Client systems 414 are interconnected to the Internet through network connections 415, such as a local area network (LAN) or a wide area network (WAN), dial-in-connections, cable modems, special high-speed Integrated Services Digital Network (ISDN) lines, and RDT networks. Client systems 414 could be any device capable of connecting to the Internet including a web-based phone, PDA, or other web-based connectable equipment.

Server system 412 includes a database server 416 connected to a database 420, which contains information on a variety of matters, as described below in greater detail. In one embodiment, database 420 is centralized on, for example, server system 412 and can be accessed by potential users at one of client systems 414 by logging onto server system 412 through one of client systems 414. In an alternative embodiment, database 420 is stored remotely from server system 412 and may be non-centralized.

Database 420 may include a single database having separated sections or partitions, or may include multiple databases, each being separate from each other. Database 420 may store transaction data generated over payment card interchange network 28 including data relating to payment card transactions, fraudulent payment card transactions, and fraud scoring values and rules. Database 420 may also store account data for a plurality of cardholders, including at least one of a cardholder name, a cardholder address, an account number, other account identifiers, and transaction information. Database 420 may also store merchant data including a merchant identifier that identifies each merchant registered to use the network, and instructions for settling transactions including merchant bank account information. Database 420 may also store purchase data associated with items being purchased by a cardholder from a merchant, and authorization request data. Database 420 may also store fraud information received from fraud analysis computing system 100.

In the example embodiment, one of client systems 414 is a user computer device associated with a user of fraud analysis computing system 100. For example, the user computer device is configured to display graphical user interface 150 (shown in FIGS. 1 and 2) generated by fraud analysis computing system 100 via a web browser or dashboard application 136 (shown in FIG. 1) installed on the user computer device. Web browsers enable users of client system 414 to display and interact with media and other information typically embedded on a web page or a website associated with server system 412. Dashboard application 136 allows users to interact with a server application on server system 412.

Others of client systems 414 may be associated with acquirer or merchant bank 26 and issuer 30 (shown in FIG. 3). In addition, client systems 414 may include a computer system associated with at least one of an online bank, a bill payment outsourcer, an acquirer bank, an acquirer processor, an issuer bank associated with a payment card, an issuer processor, a remote payment system, customers and/or billers. In the example embodiment, server system 412 is associated with payment card interchange network 28, and may be referred to as an interchange computer system. Server system 412 may be used for general processing of payment card transaction data as well as analyzing fraud data associated with payment card transactions.

Figure 5:
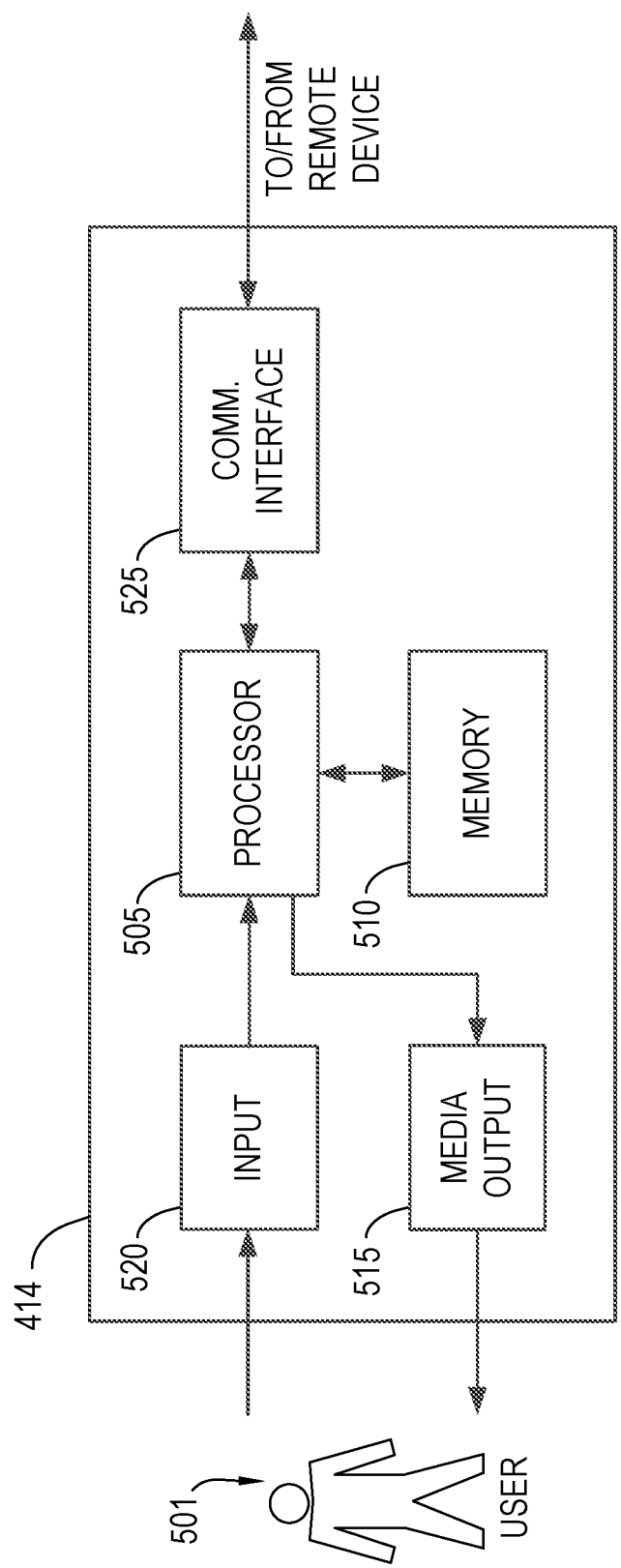

FIG. 5 illustrates an example configuration of one of client systems 414 operated by a user 501, such as an analyst. In the example embodiment, client system 414 includes a processor 505 for executing instructions. In some embodiments, executable instructions are stored in a memory area 510. Processor 505 may include one or more processing units, for example, a multi-core configuration.

Memory area 510 is any device allowing information such as executable instructions and/or written works to be stored and retrieved. Memory area 510 may include one or more computer readable media.

Client system 414 also includes at least one media output component 515 for presenting information to user 501. Media output component 515 is any component capable of conveying information to user 501. For example, media output component is configured to display graphical user interface 150 (shown in FIG. 1) to user 501. In some embodiments, media output component 515 includes an output adapter such as a video adapter and/or an audio adapter. An output adapter is operatively coupled to processor 505 and operatively coupleable to an output device such as a display device, a liquid crystal display (LCD), organic light emitting diode (OLED) display, or "electronic ink" display, or an audio output device, a speaker or headphones.

In some embodiments, client system 414 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 220. Client system 414 may also include a communication interface 525, which is communicatively coupleable to a remote device such as server system 412. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Figure 6:
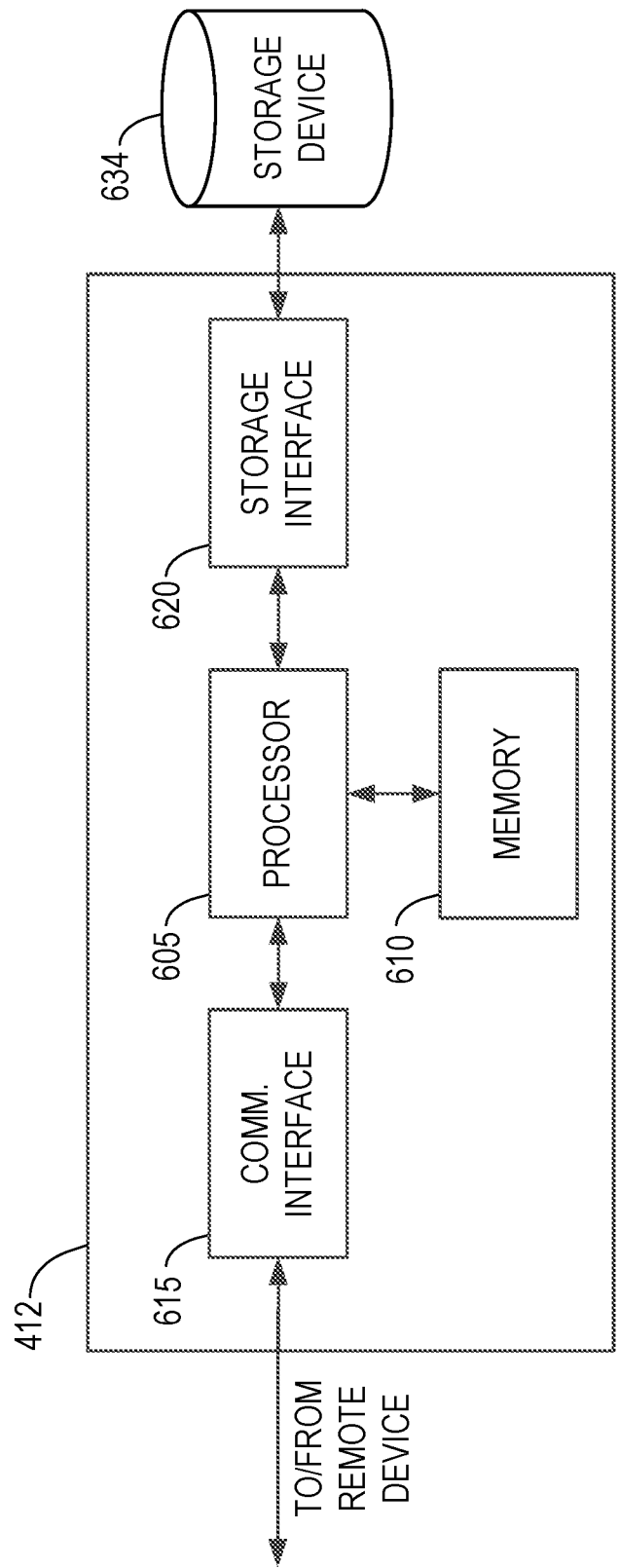

FIG. 6 illustrates an example configuration of server system 412. Server system 412 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on the server system 412, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 605 is operatively coupled to a communication interface 615 such that server system 412 is capable of communicating with remote devices such as client systems 414 (shown in FIG. 4) or another server system 412. For example, communication interface 615 may receive requests from client system 414 via the Internet, as illustrated in FIG. 4.

Processor 605 may also be operatively coupled to a storage device 634, which may be used to implement database 420. Storage device 634 is any computer-operated hardware suitable for storing and/or retrieving data. In some embodiments, storage device 634 is integrated in server system 412. For example, server system 412 may include one or more hard disk drives as storage device 634. In other embodiments, storage device 634 is external to server system 412 and may be accessed by a plurality of server systems 412. For example, storage device 634 may include multiple storage units such as hard disks or solid state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Memory area 610 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In operation, fraud analysis computing system 100 (shown in FIG. 1) runs on server system 412. In some embodiments, at least one of first fraud model 102, ratio striping engine 104, and second fraud model 108 runs on the same server system 412. Alternatively, each of first fraud model 102, ratio striping engine 104, and second fraud model 108 runs on separate server systems 412 communicatively coupled to each other. User 501 (shown in FIG. 5) interacts with server system 412, and processes such as ratio striping engine 104, using one of client systems 414 (shown in FIG. 4).

Figure 7:
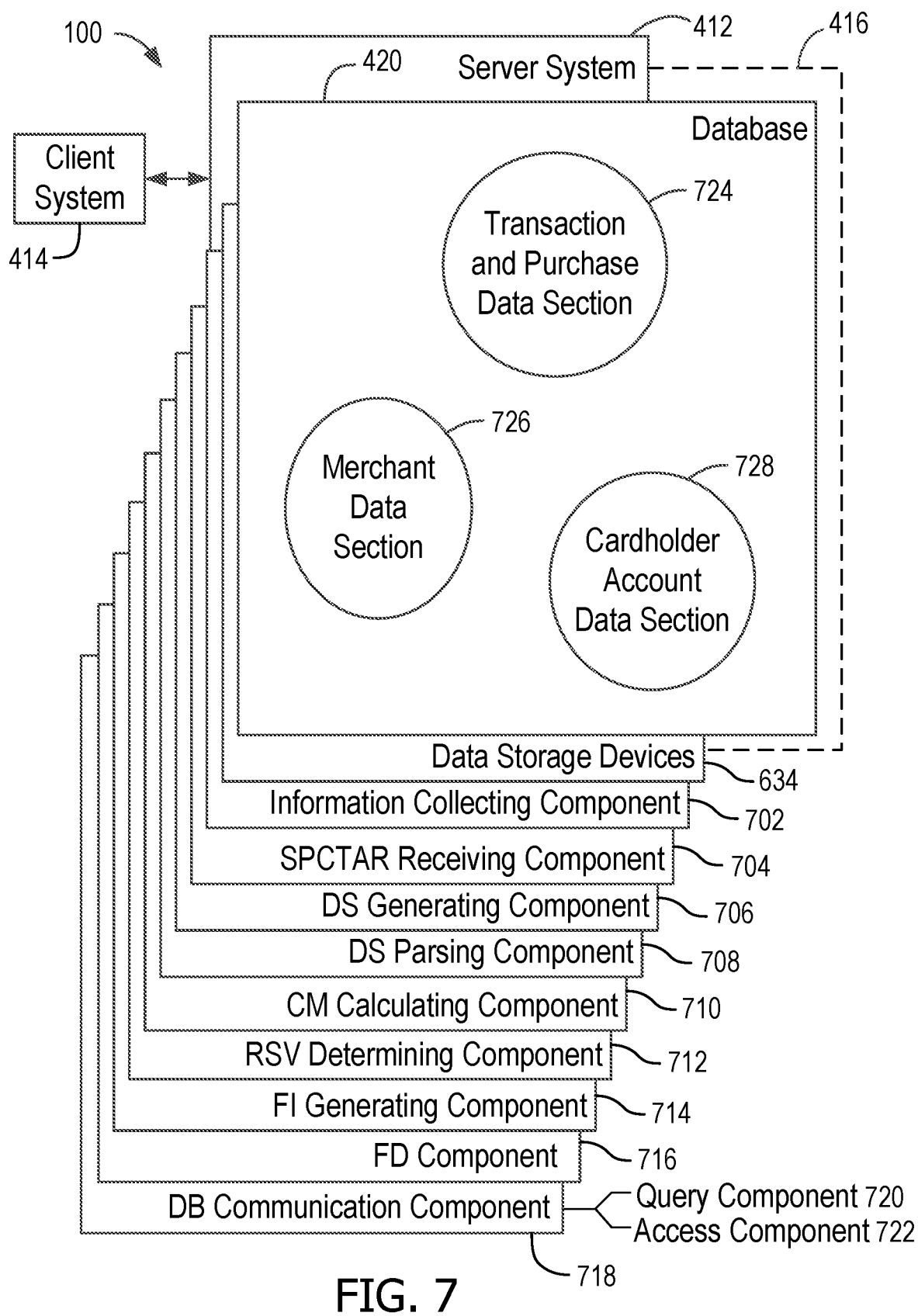

FIG. 7 shows an example configuration of fraud analysis computing system 100. Database 420 is coupled to several separate components or modules within fraud analysis computing system 100, which perform specific tasks. In the example embodiment, server system 412, database server 416, and database 420 are all contained in a single computing device. In other embodiments, fraud management server system 412, database server 416, and database 420 may be distributed over separate computing devices which are communicatively coupled to each other.

Fraud analysis computing system 100 in the example embodiment includes an information collecting component 702 for collecting information from users into database 420, a scored payment card transaction authorization request receiving component 704 for receiving scored payment card transaction authorization requests 112, an account range data structure generating component 706 to generate at least one account range data structure 130 having scored payment card transaction authorization requests 112 associated with a corresponding account range and sorted by fraud score, an account range data structure parsing component 708 to parse the at least one account range data structure 130 over a plurality of account range time periods, and an account range cumulative metric calculating component 710 to calculate cumulative metrics for various ones of the ratio striping time periods based on the parsed at least one account range data structure. Fraud analysis computing system 100 further includes a ratio striping value determining component 712 for determining ratio striping values from the cumulative metrics as described above. In some embodiments, a feature input generating component 714 generates sets of feature inputs 120 using the determined ratio striping values. A fraud detection component 716 is configured to detect a fraud event associated with at least one of the account ranges based on the ratio striping values determined for the corresponding account range data structure 130.

Fraud analysis computing system 100 also includes a database communication component 718 that includes a query component 720 programmed to receive a specific query from client system 414, and an access component 722 to access database 420. Query component 720 is programmed for receiving a specific query, a data request and/or a data message (collectively referred to as a "query") from one of a plurality of users. Database communication component 718 searches and processes received queries against storage device 634 containing a variety of information collected by collection component 702. In an exemplary embodiment, database 420 is divided into a plurality of sections, including but not limited to, a Transaction and Purchase Data Section 724, a Merchant Data Section 726, and a Cardholder Account Data Section 728. These sections within database 420 are interconnected to update and retrieve the information as required.

Figure 8:
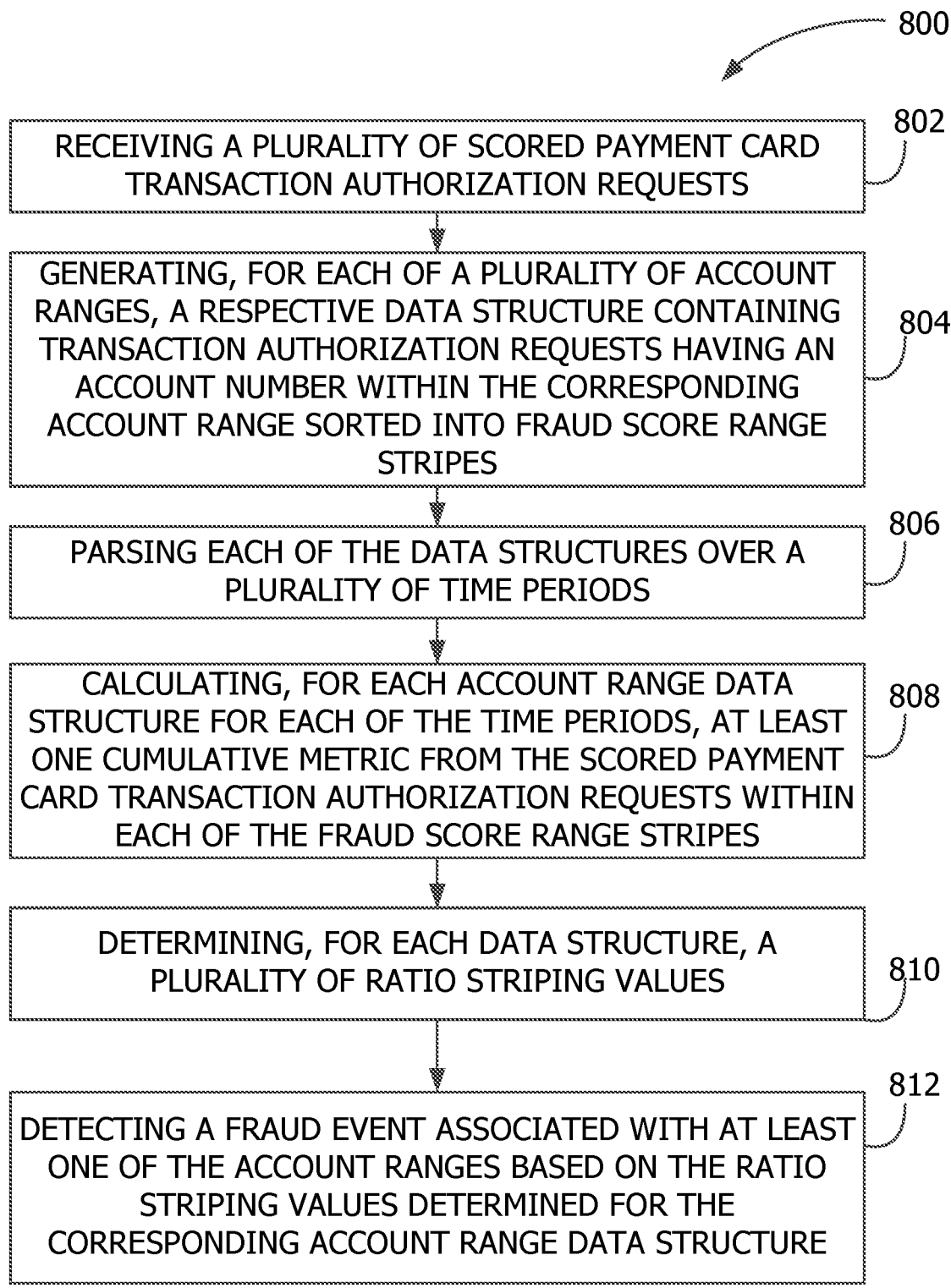

FIG. 8 is a flow diagram of a computer-implemented method 800 for detecting fraudulent network transactions in a payment card transaction network. Method 800 uses at least one computing device, such as fraud analysis computing system 100. The at least one computing device has at least one processor, such as processor 105, and the at least one processor performs the steps of the method.

With reference also to FIGS. 1 and 2, method 800 includes receiving 802, by the at least one processor, a plurality of scored payment card transaction authorization requests 112. Each of the scored payment card transaction authorization requests 112 includes a respective one of a plurality of payment card transaction authorization requests 116 received via payment card interchange network 28. Each of the payment card transaction authorization requests 116 includes a respective account number and is associated with a respective fraud score, for example the reweighted fraud score generated by merchant profiling engine 102.

Method 800 also includes generating 804, for each of a plurality of account ranges, a respective account range data structure 130. Each account range data structure 130 includes the scored payment card transaction authorization requests 112 having the account number within the corresponding account range. In the example embodiment, each account range data 130 structure sorts the scored payment card transaction authorization requests 112 within the associated account range over a plurality of fraud score range stripes based on the corresponding fraud score. Method 800 further includes parsing 806 each of the account range data structures 130 over a plurality of ratio striping time periods. Each of the ratio striping time periods extends back over a respective predetermined ratio striping interval from a common ratio striping starting point.

Additionally, method 800 includes calculating 808, for each account range data structure 130 for each of the ratio striping time periods, at least one cumulative account range metric from the scored payment card transaction authorization requests 112 associated with each of the fraud score range stripes within the respective ratio striping time period. Method 800 also includes determining 810, for each account range data structure 130, a plurality of ratio striping values. Each of the ratio striping values is a ratio of a first value of the at least one cumulative account range metric in a first of the fraud score range stripes from a first ratio striping time period with respect to a second value of the at least one cumulative account range metric in the first fraud score range stripe from a second ratio striping time period. Method 800 further includes detecting 812 a fraud event associated with at least one of the account ranges based on the ratio striping values determined for the corresponding account range data structure 130.

As used herein, "machine learning" refers to statistical techniques to give computer systems the ability to "learn" (e.g., progressively improve performance on a specific task) with data, without being explicitly programmed for that specific task.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing system for detecting a pattern of fraudulent network events in a payment card network, said computing system comprising at least one processor programmed to:
   continuously receive, by said at least one processor, a plurality of scored transaction authorization requests each including a respective account number and a respective fraud score, wherein the respective fraud score is proportional to indicia of fraud present in an individual transaction corresponding to the respective scored transaction authorization request;
   sort, by said at least one processor, the scored transaction authorization requests into a plurality of account ranges, wherein each of the account ranges includes the scored transaction authorization requests having the account number within the corresponding account range;
   sort, by said at least one processor, the transaction authorization requests within each of the account ranges into a plurality of fraud score range stripes based on the corresponding fraud score;
   calculate, by said at least one processor, for the scored transaction authorization requests within each fraud score range stripe within each account range, a ratio of a cumulative metric for a shorter time period over a longer time period, wherein the shorter and longer time periods extend back from a common starting point; and
   detect, by said at least one processor, in near real-time relative to the common starting point, a fraud event associated with one of the account ranges based on the ratio for one of the fraud score range stripes within the one of the account ranges, wherein the one of the fraud score range stripes corresponds to a subset of the scored transaction authorization requests associated with relatively few of the indicia of fraud in the corresponding individual transactions.

2. The computing system of claim 1, wherein the at least one processor is further configured to set the common starting point to be one of a present time and a timestamp associated with the most recently received one of the scored transaction authorization requests.

3. The computing system of claim 1, wherein the at least one processor is further configured to:
   provide the ratios for each fraud score range stripe within each account range as inputs to a downstream fraud detection model; and
   execute the downstream fraud detection model.

4. The computing system of claim 3, wherein the downstream fraud detection model is a machine learning model, and wherein the at least one processor is further configured to use the ratios to calculate feature inputs to the machine learning model.

5. The computing system of claim 1, wherein the at least one processor is further configured to determine at least one of the plurality of account ranges based on a corresponding bank identification number (BIN).

6. The computing system of claim 1, wherein the at least one processor is further configured to output a potential fraud attack alert associated with all account numbers within the one of the account ranges.

7. The computing system of claim 1, wherein the at least one processor is further configured to calculate the cumulative metric within each of the shorter and longer time periods using at least one of i) a tally of the scored transaction authorization requests within the respective fraud score range stripe and the respective account range, and ii) a cumulative total of transaction amounts of the scored transaction authorization requests within the respective fraud score range stripe and the respective account range.

8. A computer-implemented method for detecting a pattern of fraudulent network events in a payment card network, said method implemented by a computing system including at least one processor, said method comprising, by the at least one processor:
   continuously receiving, by said at least one processor, a plurality of scored transaction authorization requests each including a respective account number and a respective fraud score, wherein the respective fraud score is proportional to indicia of fraud present in an individual transaction corresponding to the respective scored transaction authorization request;
   sorting, by said at least one processor, the scored transaction authorization requests into a plurality of account ranges, wherein each of the account ranges includes the scored transaction authorization requests having the account number within the corresponding account range;
   sorting, by said at least one processor, the transaction authorization requests within each of the account ranges into a plurality of fraud score range stripes based on the corresponding fraud score;

calculating, by said at least one processor, for the scored transaction authorization requests within each fraud score range stripe within each account range, a ratio of a cumulative metric for a shorter time period over a longer time period, wherein the shorter and longer time periods extend back from a common starting point; and detecting, by said at least one processor, in near real-time relative to the common starting point, a fraud event associated with one of the account ranges based on the ratio for one of the fraud score range stripes within the one of the account ranges, wherein the one of the fraud score range stripes corresponds to a subset of the scored transaction authorization requests associated with relatively few of the indicia of fraud in the corresponding individual transactions.

9. The computer-implemented method of claim 8, further comprising setting, by the at least one processor, the common starting point to be one of a present time and a timestamp associated with the most recently received one of the scored transaction authorization requests.

10. The computer-implemented method of claim 8, further comprising:
providing, by the at least one processor, the ratios for each fraud score range stripe within each account range as inputs to a downstream fraud detection model; and
executing by the at least one processor, the downstream fraud detection model.

11. The computer-implemented method of claim 10, wherein the downstream fraud detection model is a machine learning model, said method further comprising using, by the at least one processor, the ratios to calculate feature inputs to the machine learning model.

12. The computer-implemented method of claim 8, further comprising determining, by the at least one processor, at least one of the plurality of account ranges based on a corresponding bank identification number (BIN).

13. The computer-implemented method of claim 8, further comprising outputting, by the at least one processor, a potential fraud attack alert associated with all account numbers within the one of the account ranges.

14. The computer-implemented method of claim 8, further comprising calculating, by the at least one processor, the cumulative metric within each of the shorter and longer time periods using at least one of i) a tally of the scored transaction authorization requests within the respective fraud score range stripe and the respective account range, and ii) a cumulative total of transaction amounts of the scored transaction authorization requests within the respective fraud score range stripe and the respective account range.

15. At least one non-transitory computer-readable storage media having computer-executable instructions embodied thereon wherein, when executed by at least one processor, the computer-executable instructions cause the at least one processor to:
continuously receive, by said at least one processor, a plurality of scored transaction authorization requests each including a respective account number and a respective fraud score, wherein the respective fraud score is proportional to indicia of fraud present in an individual transaction corresponding to the respective scored transaction authorization request;

sort, by said at least one processor, the scored transaction authorization requests into a plurality of account ranges, wherein each of the account ranges includes the scored transaction authorization requests having the account number within the corresponding account range;

sort, by said at least one processor, the transaction authorization requests within each of the account ranges into a plurality of fraud score range stripes based on the corresponding fraud score;

calculate, by said at least one processor, for the scored transaction authorization requests within each fraud score range stripe within each account range, a ratio of a cumulative metric for a shorter time period over a longer time period, wherein the shorter and longer time periods extend back from a common starting point; and detect, by said at least one processor, in near real-time relative to the common starting point, a fraud event associated with one of the account ranges based on the ratio for one of the fraud score range stripes within the one of the account ranges, wherein the one of the fraud score range stripes corresponds to a subset of the scored transaction authorization requests associated with relatively few of the indicia of fraud in the corresponding individual transactions.

16. The at least one non-transitory computer-readable storage media of claim 15, wherein the computer-executable instructions further cause the at least one processor to set the common starting point to be one of a present time and a timestamp associated with the most recently received one of the scored transaction authorization requests.

17. The computing system of claim 1, wherein the at least one processor is further configured to:
provide the ratios for each fraud score range stripe within each account range as inputs to a downstream fraud detection model; and
execute the downstream fraud detection model.

18. The at least one non-transitory computer-readable storage media of claim 17, wherein the downstream fraud detection model is a machine learning model, and wherein the computer-executable instructions further cause the at least one processor to use the ratios to calculate feature inputs to the machine learning model.

19. The computing system of claim 1, wherein the computer-executable instructions further cause the at least one processor to determine at least one of the plurality of account ranges based on a corresponding bank identification number (BIN).

20. The computing system of claim 1, wherein the computer-executable instructions further cause the at least one processor to output a potential fraud attack alert associated with all account numbers within the one of the account ranges.

* * * * *